United States Patent
Miyazawa et al.

(10) Patent No.: US 8,061,853 B2
(45) Date of Patent: Nov. 22, 2011

(54) IMAGE DISPLAY DEVICE HAVING PLURALITY OF LIGHT MODULATION DEVICES, POSITION CHANGE UNIT, AND CONTROL UNIT AND DISPLAY POSITION ADJUSTMENT SYSTEM AND METHOD

(75) Inventors: Yasunaga Miyazawa, Okaya (JP); Yoshihito Yamada, Suwa (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 895 days.

(21) Appl. No.: 12/074,945

(22) Filed: Mar. 8, 2008

(65) Prior Publication Data

US 2008/0225186 A1    Sep. 18, 2008

(30) Foreign Application Priority Data

Mar. 15, 2007    (JP) .................................. 2007-066331

(51) Int. Cl.
 *G03B 21/14*    (2006.01)

(52) U.S. Cl. ........... 353/79; 353/121; 348/802; 348/803

(58) Field of Classification Search ............... 353/69, 353/79, 121, 7, 122, 94; 348/778–780, 800–803, 348/798
See application file for complete search history.

(56) References Cited

U.S. PATENT DOCUMENTS

| 6,222,593 B1 * | 4/2001 | Higurashi et al. ............ 348/745 |
| 2007/0024824 A1 * | 2/2007 | Damera-Venkata et al. ... 353/94 |

FOREIGN PATENT DOCUMENTS

| JP | 06-123868 | 5/1994 |
| JP | 08-168039 A | 6/1996 |
| JP | 2004-228824 A | 8/2004 |

* cited by examiner

*Primary Examiner* — Francis M Legasse, Jr.
(74) *Attorney, Agent, or Firm* — AdvantEdge Law Group, LLC

(57) ABSTRACT

The disclosure is directed to image display devices and display position adjustment systems and methods. In one example, an image display device includes a control unit configured to acquire one or more characteristics of optical images. The control unit is configured to designate, based on the acquired characteristics of the optical images, one of the optical images as a reference image and the remaining number of the optical images as non-reference images. A position change unit moves the non-reference images in accordance with a pixel position of the reference image.

17 Claims, 16 Drawing Sheets

IMAGE DISPLAY DEVICE HAVING PLURALITY OF LIGHT MODULATION DEVICES, POSITION CHANGE UNIT, AND CONTROL UNIT AND DISPLAY POSITION ADJUSTMENT SYSTEM AND METHOD

CROSS-REFERENCE

The present application claims priority from Japanese Patent Application No. 2007-066331 filed on Mar. 15, 2007, which is hereby incorporated by reference in its entirety.

BACKGROUND

Previously-known image display devices may include a plurality of image display sections each including a light source, a light modulation device, and a projection optical device. The light modulation device forms an optical image through modulation of luminous fluxes coming from the light source in accordance with image information, and the projection optical device extends and projects the formed optical image. The image display device of such a type displays an image being a result of overlay of at least a part of the projection areas of the optical images. Such an image display device is exemplified by a stack-type multi-projection system that includes a plurality of projectors, and displays, with an overlay, pixels of optical images formed through projection by the projectors. Another possible multi-projection system is of a type that displays, with a displacement, pixels of optical images in such a manner that a pixel of one optical image is located between pixels of another optical image. The light modulation device for use in the display section is exemplified by a liquid crystal panel, a device using a micromirror, and others.

The image display device equipped with a plurality of light modulation devices as such, however, may require adjustment of pixel positions in optical images formed by the light modulation devices through position adjustment of the optical images. To meet such requirements, a projection-type display device using a light shifting device, i.e., projection display device, has been available. As an example, refer to Japanese Patent Publication No. JP-A-6-123868.

With the projection-type display device of JP-A-6-123868, a light shifting device such as a flat transparent substrate is disposed on an optical path for luminous fluxes having been passed through the light modulation devices. Using the light shifting device, luminous fluxes of optical images formed by the light modulation devices are shifted in the direction orthogonal to the optical axis of the luminous fluxes, thereby adjusting the positions of the optical images projected on the screen.

One of the problems with such a projection-type display device of JP-A-6-123868 is that, when optical images formed by the light modulation devices do not all have the same characteristics, the optical images may not be easily adjusted appropriately in position. That is, when the projection-type display device is provided with two light modulation devices, and when position adjustment is so performed as to achieve position alignment between optical images formed by the two light modulation devices, one of the optical images is to be used as a reference for position alignment with the other optical image. Problematically, the projection-type display device of JP-A-6-123868 gives no consideration to the characteristics of the optical images formed by the light modulation devices. There is thus a possibility that the resulting synthesized image may not have a sufficient level of quality.

SUMMARY

In certain embodiments an image display device may include: a light source; a plurality of light modulation devices that each form an optical image through modulation of a luminous flux coming from the light source in accordance with image information, and display an image being a result of overlay of at least a part of the optical images; a position change unit that moves the optical images for position change; and a control unit that controls over the image display device. The control unit may include: a characteristics acquisition section that acquires characteristics of the optical images; a reference image setting section that selects any of the optical images for use as a reference image based on the acquired characteristics of the optical images; and a position change unit control section that moves, using the position change unit, in accordance with positions of pixels configuring the reference image, any remaining of the optical images formed by the light modulation devices not including the light modulation device forming the reference image.

In certain embodiments, the reference image setting section in the control unit may select, for use as a reference image, any of the optical images formed by a plurality of light modulation devices based on the characteristics of each of the optical images. The position change unit control section in the position change unit moves, in accordance with the reference image, any remaining of the optical images formed by the light modulation devices not including the light modulation device forming the optical image being a reference image.

This enables, even when the optical images formed by a plurality of light modulation devices are not all having the same characteristics, the setting of a reference image appropriately based on the characteristics of the optical images. As such, the remaining optical images may be moved in position in accordance with the pixel position in the reference image so that the optical images can be positioned with appropriateness and relative ease.

In certain embodiments, an image display device comprises a light source configured to provide a luminous flux. A plurality of light modulation devices are configured to form a plurality of optical images through modulation of the luminous flux provided by the light source in accordance with image information. The light modulation devices are further configured to display an image by combining at least a portion of the optical images. A position change unit is configured to move the optical images for position change. A control unit is configured to control the image display device. The control unit may include a characteristics acquisition section configured to acquire one or more characteristics of one or more of the optical images. The control unit may include a reference image setting section configured to designate one of the optical images as a reference image based on the acquired characteristics of the optical images and a remaining number of the optical images as non-reference images. The control unit may include a position change unit control section configured to cause the position change unit to move the non-reference images in accordance with a pixel position of the reference image.

In certain embodiments, the image display device is further provided with a plurality of image display sections, and each of the image display sections may include: a light source; a light modulation device that forms an optical image through modulation of a luminous flux coming from the light source in accordance with image information; and a projection optical device that projects the optical image onto a projection surface. An image being a result of overlay of at least a part of the optical images projected from the image display sections is displayed.

In certain embodiments, the position change unit control section in the control unit moves the remaining optical images in such a manner as to derive an overlay of pixels configuring the remaining optical images onto the pixels configuring the reference image.

Herein, a pixel denotes the minimum unit configuring an image related to each of the optical images, and can be a representation of a unit distinguishable in terms of color density, color, and others.

According to certain embodiments, pixels of optical images formed by the light modulation devices are overlaid on pixels of any one of the optical images selected for use as a reference image. As a result, the pixel intensity can be increased in an image being a result of overlay of optical images so that the resulting image can be of high intensity.

As an alternative configuration, the position change unit control section in the control unit may move the remaining optical images in such a manner as to achieve positioning of pixels configuring the remaining optical images between the pixels configuring the reference image.

A liquid crystal panel serving as a light modulation device may be provided with a black matrix between pixels for hiding a pixel wiring section or a switching element such as a transistor. This black matrix passes through no light, and thus has nothing to do with the formation of pixels. Therefore, when an optical image is enlarged in size for observation, black portions are found in the shape of a lattice. In consideration thereof, the position change unit moves an optical image in such a manner as to locate pixels thereof between pixels of another optical image, i.e., the reference image, thereby favorably increasing the number of pixels in the resulting synthesized image. As such, the resulting image can be displayed with higher definition.

In certain embodiments, an image capturing unit is further included for capturing the displayed optical image, the control unit includes a captured image acquisition section that acquires an image being a result of image capturing by the image capturing unit, and the characteristics acquisition section acquires the characteristics of the optical images related to the image being the image capturing result.

Herein, the image capturing unit may be exemplified by a CCD (Charge Coupled Device) camera, a device equipped with a CMOS (Complementary Metal-Oxide Semiconductor device) sensor, and others.

In certain embodiments, the characteristics acquisition section acquires the characteristics of optical images related to an image captured by the image capturing unit as the characteristics of the optical images formed by the light modulation devices. This enables the reference image setting section to set a reference image in accordance with the characteristics of the optical images actually displayed on the screen. As such, the display state of optical images, e.g., the projection characteristics of optical images when the optical images are those projected by a projection optical device or others equipped with a lens, can be included in the characteristics of the optical images to be used for the setting of a reference image so that the setting of a reference image can be performed with more appropriateness.

In certain embodiments, the characteristics of the optical images may be at least either an intensity of the optical images or a chromaticity thereof, and the reference image setting section may select, for use as the reference image, any of the optical images related to the captured image showing a largest value for at least either the intensity or the chromaticity.

As to optical images related to an image captured by the image capturing unit, with any of the optical images showing the intensity higher than the other optical images, pixels configuring the optical image can be recognized with relative ease. Similarly, as to the optical images related to the captured image, with any of the optical images showing the chromaticity higher than the other optical images, pixel recognition can be relatively easily performed. In consideration thereof, in certain embodiments, the reference image setting section selects, for use as a reference image, any of the optical images related to the captured image showing a higher value for the intensity or chromaticity, thereby easing pixel recognition for the reference image to a further degree. This may ease moving the other optical images by the position change unit control section. As such, the optical images can be moved in position with more appropriateness and relative ease.

In certain embodiments, the characteristics of the optical images are at least either an occurrence frequency of an intensity variation in the optical images or an occurrence frequency of a color variation therein, and the reference image setting section may select, for use as the reference image, any of the optical images related to the captured image showing a smallest value for at least either the occurrence frequency of the intensity variation or the occurrence frequency of the color variation.

Similarly to the above-described case with the intensity and the chromaticity, as to the optical images related to the image captured by the image capturing unit, with any of the optical images showing a lower value for the occurrence frequency of the intensity variation and that of the color variation than the other optical images, pixels configuring the optical image can be recognized with relative ease. In certain embodiments, the reference image setting section may select, for use as a reference image, any of the optical images showing a smallest value for at least either the occurrence frequency of the intensity variation or that of the color variation, thereby facilitating recognition of pixel position of the reference image. This enables the position change control section to perform position adjustment of optical images with appropriateness and relative ease.

In certain embodiments, the image capturing unit may include a plurality of image-capturing pixels aligned in a predetermined direction, the characteristics of the optical images are a tilt of the optical images, and the reference image setting section selects, for use as the reference image, any of the optical images showing a smallest value for the tilt in the predetermined direction.

When the image capturing unit captures an optical image, the smaller tilt in the alignment direction between the pixels in the captured optical image and the capturing pixels in the image capturing unit may lead to easier recognition of pixels in the optical image. In certain embodiments, the reference image setting section may select, for use as a reference image, any of the optical images related to the captured image showing a smallest value for a tilt in the alignment direction of the image-capturing pixels, thereby facilitating recognition of pixel position of the reference image similar to the case described above. This allows the position change unit control section to perform position adjustment of optical images with relative ease and appropriateness.

In certain embodiments, a storage section is further included for storing resolution information about a resolution of each of the light modulation devices. The characteristics of the optical images are a resolution of the optical images, and the reference image setting section selects, based on the resolution information, for use as the reference image, any of the optical images formed by the light modulation device showing a largest value for the resolution.

If there are two optical images with a resolution difference therebetween, i.e., the resolution of one optical image is higher than the other, adjustment of pixel position may be more easily performed if the higher-resolution optical image is used as a basis for alignment of pixels with the other lower-resolution optical image. In certain embodiments, the reference image setting section acquires the resolution information stored in the storage section, and performs the setting of a reference image in accordance with the resolution of each of the light modulation devices found in the resolution information. With such a setting, the remaining optical images can be adjusted in position with relative ease. The image capturing unit is no more required to capture the optical images as in the above so that the optical images can be adjusted in position with relative swiftness.

In certain embodiments, the characteristics of the optical images are a cumulative drive time of the light modulation devices, and the reference image setting section selects, for use as the reference image, any of the optical images formed by the light modulation device showing a smallest value for the cumulative drive time.

When the cumulative drive time is lengthened in the light modulation devices, the light modulation devices may fail to appropriately modulate luminous fluxes. If this is the case, the resulting optical images formed by the light modulation devices may degrade in quality. In certain embodiments, the reference image setting section selects, for use as a reference image, any of the optical images formed by the light modulation device showing a smallest value for the cumulative drive time, thereby facilitating recognition of pixel position of the reference image. This enables to more easily move optical images formed by any other light modulation devices for position adjustment with the reference image so that the optical images can be adjusted in pixel position with appropriateness and relative ease.

In certain embodiments, a display position adjustment method for use with an image display device may include a light source and a plurality of light modulation devices that each form an optical image through modulation of a luminous flux coming from the light source in accordance with image information and displaying an image being a result of overlay of at least a part of the optical images, and for position adjustment of each of the optical images. The image display device may be provided with a position change unit that moves the optical images for position change, and the display position adjustment method may include the steps of: acquiring characteristics of the optical images; selecting any of the optical images for use as a reference image based on the acquired characteristics of the optical images; and moving, using the position change unit, in accordance with positions of pixels configuring the reference image, any remaining of the optical images formed by the light modulation devices not including the light modulation device forming the reference image.

According to certain embodiments, based on the characteristics of the optical images acquired by the acquiring, in the selecting, any one of the optical images formed by the light modulation devices may be set for use as a reference image. Thereafter, in the moving, in accordance with the pixel position of the reference image set as such, the position change unit may move any remaining of the optical images formed by the light modulation devices not including the light modulation device forming the optical image related to the reference image.

In this manner, even if the optical images formed by the light modulation devices do not all have the same characteristics, the pixel position of a reference image set in accordance with the characteristics of the optical images can be used as a basis to align the optical images formed by the light modulation devices not including the light modulation device forming the reference image. As such, the optical images may be positioned with appropriateness and relative ease.

In certain embodiments, the image display device may include: a storage section that stores image forming characteristics of each of the light modulation devices; and an image capturing unit that captures the displayed optical image. The selecting may include: a first reference image setting process of setting the reference image based on the image forming characteristics stored in the storage section; and a second reference image setting process of setting, when the reference image is not set by the first reference image setting process, the reference image based on the characteristics of the optical image captured by the image capturing unit.

In certain embodiments, the selecting may include: a first reference image setting process of setting the reference image based on the image forming characteristics stored in the storage section; and a second reference image setting process of setting, when the reference image is not set by the first reference image setting process, the reference image based on the characteristics of the optical image captured by the image capturing unit.

This allows the setting of a reference image based on the image forming characteristics acquired from the storage section to have a priority over the setting of a reference image based on the characteristics of optical image captured by the image capturing unit. As such, the image forming characteristics can be acquired relative quickly from the storage section, and when the setting of a reference image is performed based on the image forming characteristics, there is no need for the image capturing unit to go through image capturing of optical images, and to acquire characteristics of any captured optical images. This may achieve not only a relatively swift setting of a reference image and relatively swift position adjustment of optical images but also a relatively simplified process for position adjustment.

Certain embodiments are directed to a display position adjustment program for execution by an image display device including a light source and a plurality of light modulation devices that each form an optical image through modulation of a luminous flux coming from the light source in accordance with image information and displaying an image being a result of overlay of at least a part of the optical images, and for position adjustment of each of the optical images. The image display device may include: a control unit that controls over the image display device in its entirety; and a position change unit that moves the optical images for position change. The program allows the control unit to execute the steps of: acquiring characteristics of the optical images; selecting any of the optical images for use as a reference image based on the acquired characteristics of the optical images; and moving, using the position change unit, in accordance with positions of pixels configuring the reference image, any remaining of the optical images formed by the light modulation devices not including the light modulation device forming the reference image.

According to certain embodiments, by the image display device running the display position adjustment program, the procedure may go through the above-described steps so that optical images can be adjusted in position with respect to a reference image with appropriateness and relative ease.

A display position adjustment program may be recorded, for example, in a recording medium, including, but not limited to, non-volatile media, volatile media, and transmission media. Such recording medium may include a disk-shaped recording medium or a storage medium exemplified by a semiconductor. A display position adjustment program recorded in such a recording medium may be read and executed by the control unit so that the functions similar to those by the display position adjustment program described above can be achieved. Moreover, utilizing such a recording medium, the display position adjustment program described above can be installed and distributed.

BRIEF DESCRIPTION OF THE DRAWINGS

Various embodiments are described with reference to the accompanying drawings, wherein like reference numbers designate like elements.

DESCRIPTION OF EXEMPLARY EMBODIMENTS

First Embodiment

Below, a first embodiment is described by referring to the accompanying drawings.

Entire Configuration of Image Display Device 1

Figure 1:
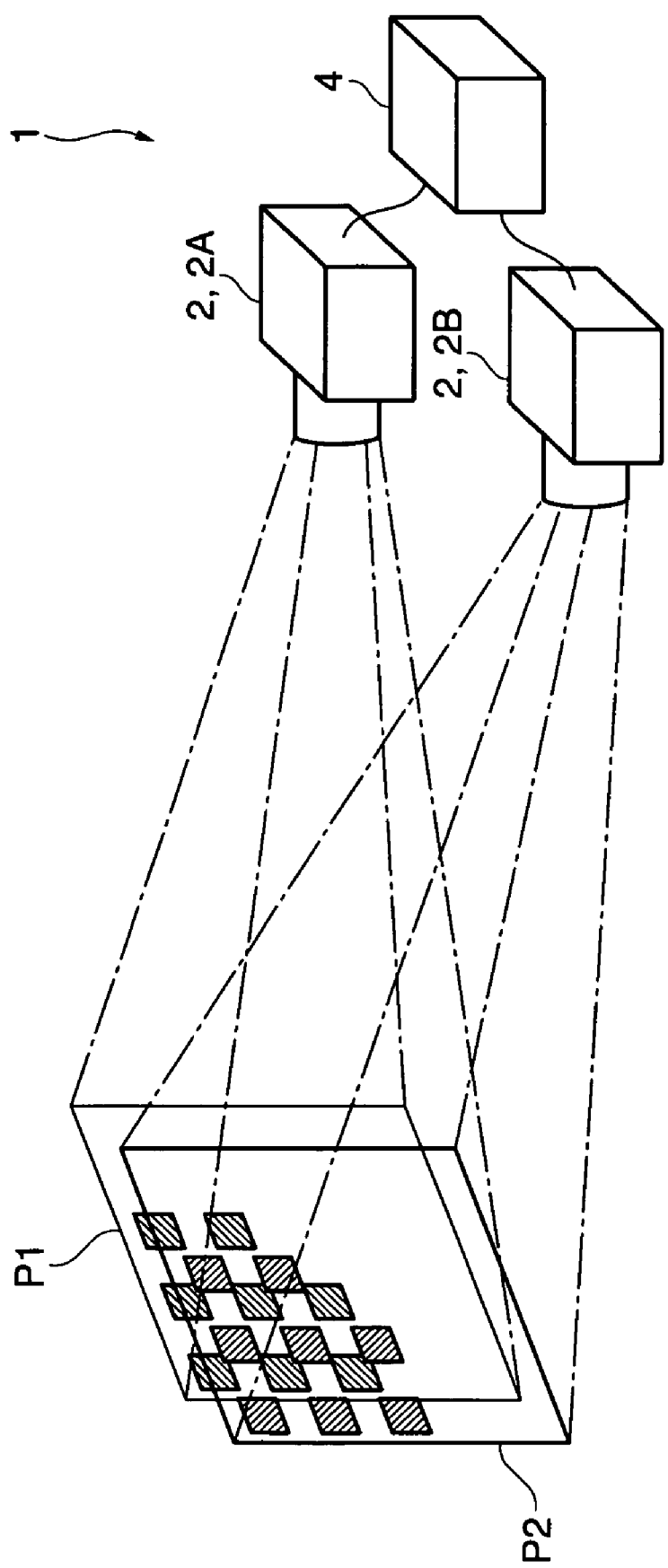
FIG. 1 is a schematic view of an image display device in accordance with a first embodiment of the invention, showing the configuration thereof.
Figure 2:
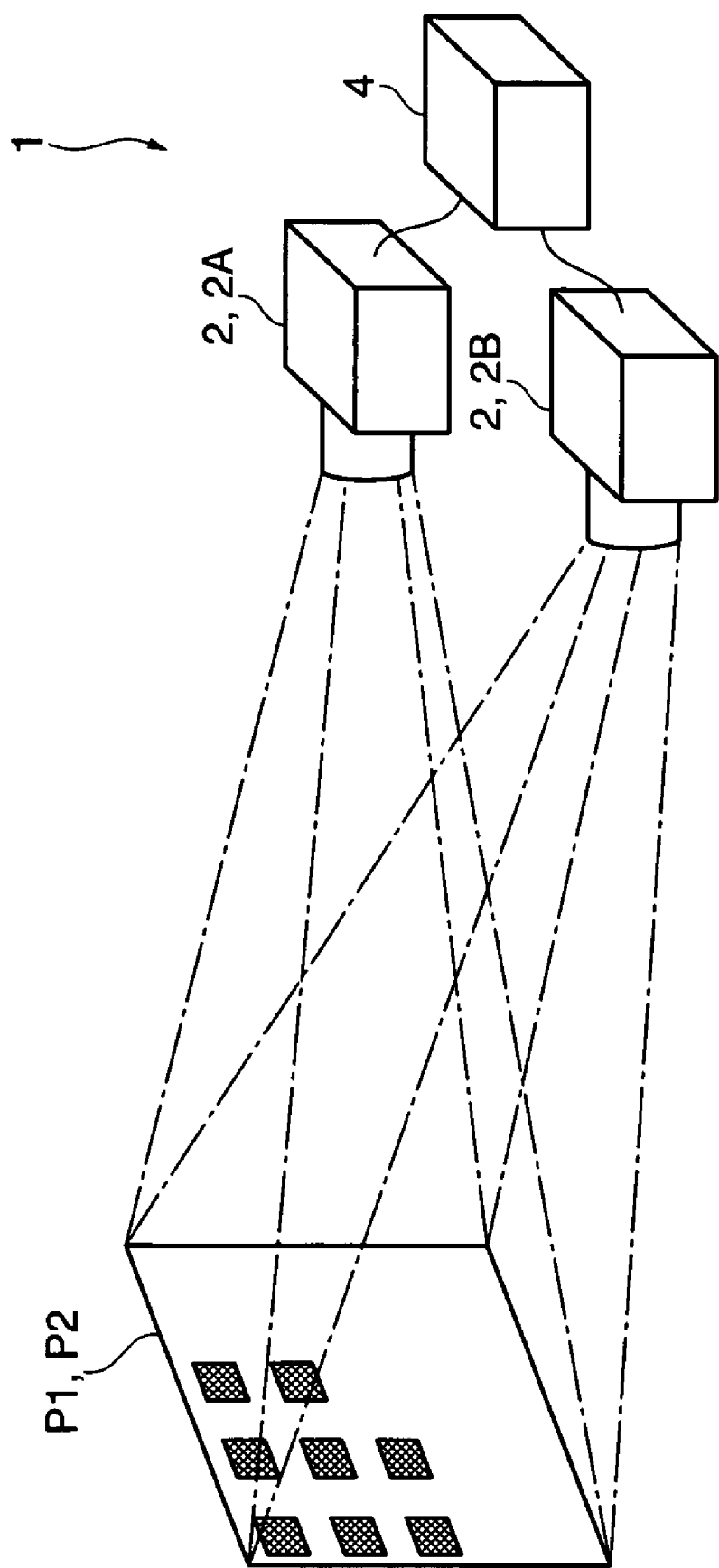
FIG. 2 is another schematic view of an image display device in accordance with a first embodiment, showing the configuration thereof.
Figure 3:
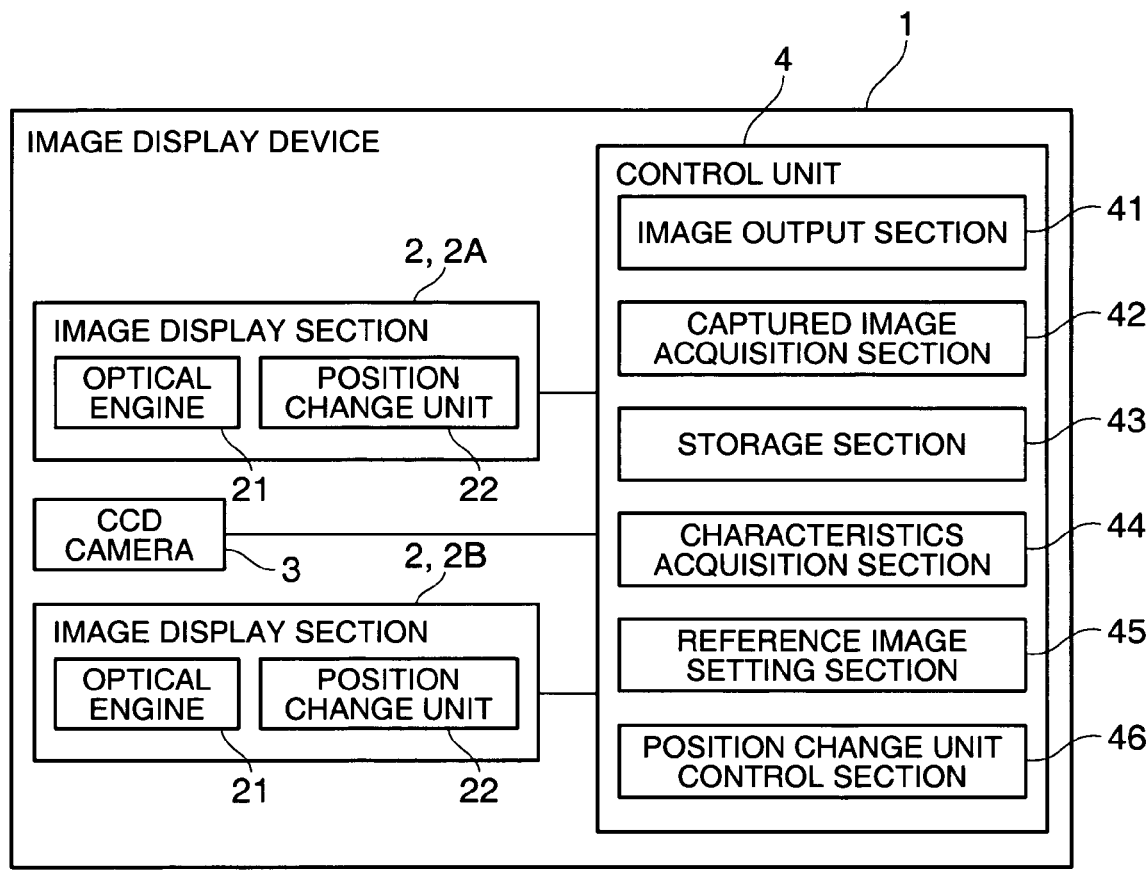
FIG. 3 is a block diagram showing the configuration of an image display device in accordance with a first embodiment.

FIGS. 1 and 2 are each a schematic view of an image display device 1 of the first embodiment, showing the configuration thereof. To be specific, FIG. 1 is a schematic view of the image display device 1 in the state before adjustment of projection positions. The projection positions are of optical images to be projected by image display sections 2, i.e., 2A and 2B, configuring the image display device 1. FIG. 2 is a schematic view of the image display device 1 in the state after the adjustment of the projection positions of the optical images. FIG. 3 is a block diagram showing the configuration of the image display device 1.

As shown in FIGS. 1 to 3, the image display device 1 of this embodiment is configured to include the two image display sections 2 (2A and 2B), a CCD (Charge Coupled Devices) camera 3 (FIG. 3), and a control unit 4. The image display sections 2A and 2B each form, through projection, optical images, and the CCD camera 3 serves as an image capturing unit. The control unit 4 serves to control the image display device 1 in its entirety. This image display device 1 aligns one optical image with the other, and overlays one on the other, and displays the resulting image. One of the optical images is the one formed by one of the image display sections 2 (in FIG. 1 example, an optical image P2 formed by the image display section 2B), and the other optical image is the one formed by the remaining image display section 2 (in FIG. 1 example, an optical image P1 formed by the image display section 2A). The image to be displayed is a result of overlay of the optical images P1 and P2. Note that, in the image display device 1 in this embodiment, the optical images P1 and P2 are overlaid together on a pixel basis.

Configuration of Image Display Section

Figure 4:
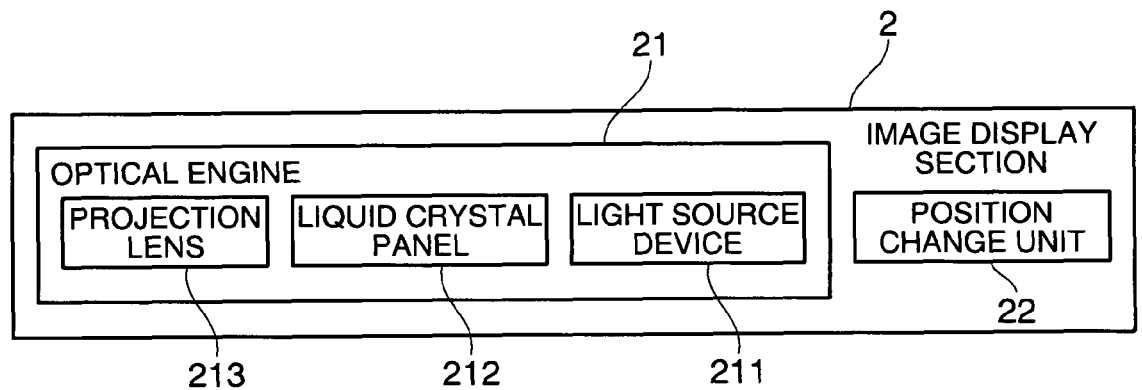
FIG. 4 is a block diagram showing the configuration of an image display section in accordance with a first embodiment.

FIG. 4 is a block diagram showing the configuration of the image display section 2.

The image display sections 2 (2A and 2B) each form an optical image in accordance with image information coming from the control unit 4, which will be described later. The resulting optical image is projected on a projection surface of a screen (not shown), for example. As shown in FIG. 4, these image display sections 2 are each configured to include an optical engine 21 and a position change unit 22.

The optical engine 21 is configured to include a light source device 211, a liquid crystal panel 212 serving as a light modulation device, and a projection lens 213 serving as a projection optical device. The liquid crystal panel 212 modulates luminous fluxes coming from the light source device 211 in accordance with image information provided by the control unit 4 so that an optical image is formed. The projection lens 213 then extends and projects luminous fluxes of the optical image, i.e., image lights, onto the projection surface. In the optical engine 21, although not shown in detail, optical elements varying in type such as cinema filter are disposed on an optical path of luminous fluxes coming from the light source device 211. The optical elements function in accordance with a display mode that will be described later.

Among these components, the light source device 211 can be exemplified by a light source lamp of discharge type such as an extra-high voltage mercury lamp, a solid-state light source such as an LED (Light Emitting Diode), and others. The light modulation device is not restrictive to the liquid crystal panel 212, and can be also exemplified by a device using a micromirror, and others.

The position change unit 22 adjusts, in accordance with a control signal coming from the control unit 4, the formation position for an optical image to be formed by the optical engine 21 on the projection surface. Such position change unit 22 is so configured as to adjust the formation position, i.e., projection position, of an optical image by displacing the liquid crystal panel 212 and the projection lens 213. Alternatively, the position change unit 22 may be so configured as to adjust the formation position of an optical image by moving the position of the optical engine 21 itself. Still alternatively, the position change unit 22 may be provided with an optical element that moves an optical path of luminous fluxes being an optical image emitted from the liquid crystal panel 212 and the projection lens 213, and the optical element may be moved in accordance with a control signal coming from the control unit 4 so that the optical image may be adjusted in formation position.

Configuration of CCD Camera

The CCD camera 3 serving as an image capturing unit is configured by a color CCD camera. In the CCD camera 3, an image-capturing pixel forming a pixel in any captured image is plurally aligned in matrix. These image-capturing pixels are each so configured as to be able to acquire the intensity and the chromaticity of color lights of R (red), G (green), and B (blue). The CCD camera 3 captures an optical image formed through projection by each of the image display sections 2. The resulting images of the optical images captured by such a CCD camera 3 are acquired by the control unit 4. Note that, in this embodiment, the image-capturing pixels are aligned in the horizontal and perpendicular directions.

Configuration of Control Unit

As described above, the control unit 4 outputs image information to both of the image display sections 2 (2A and 2B). The control unit 4 also outputs a control signal to one of the image display sections 2 based on the images of the optical images captured by the CCD camera 3. In response, the position change unit 22 of the image display section 2 adjusts the formation position of an optical image to be formed by the optical engine 21 provided with the position change unit 22. Such a control unit 4 is configured as a circuit substrate carrying thereon elements such as a CPU (Central Processing Unit).

As shown in FIG. 3, such control unit 4 is configured to include an image output section 41, a captured image acquisition section 42, a storage section 43, a characteristics acquisition section 44, a reference image setting section 45, and a position change unit control section 46.

The image output section 41 outputs image information related to an optical image to be formed to each of the image display sections 2. This image information is being in accordance with an image signal coming from any external device (not shown) connected to the image display device 1, for example. The image information is also being related to a pattern image for use with position adjustment of an optical image to be emitted from each of the image display sections 2.

The captured image acquisition section 42 acquires the images being the optical images captured by the CCD camera 3. That is, the captured image acquisition section 42 captures, for each of the image display sections 2 (2A and 2B), the captured image being the optical image formed by each of the image display sections 2.

Figure 5:
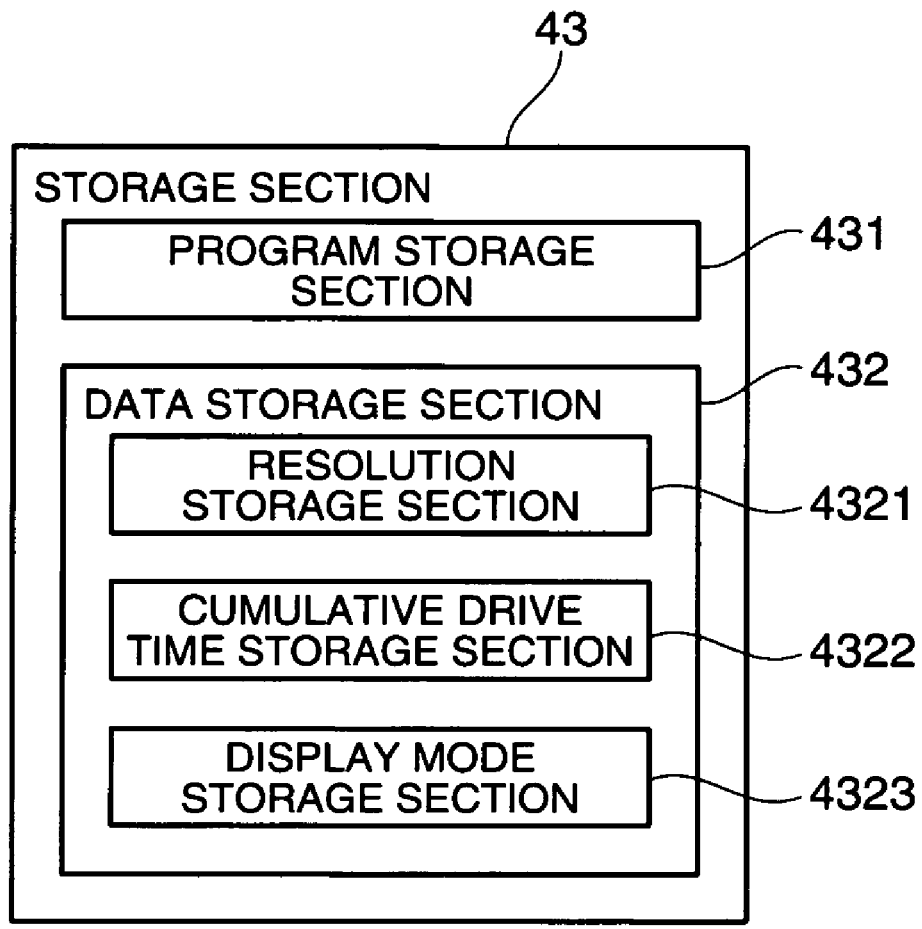
FIG. 5 is a block diagram showing the configuration of a storage section in accordance with a first embodiment.

FIG. 5 is a block diagram showing the configuration of the storage section 43.

As shown in FIG. 5, the storage section 43 is configured to include a program storage section 431 and a data storage section 432. In this embodiment, the storage section 43 is configured by a flash memory.

The program storage section 431 is storing various types of programs needed for driving of the image display device 1. As an example among such programs, the program storage section 431 stores a display position adjustment program for execution of a display position adjustment process, which will be described later.

The data storage section 432 similarly stores various types of data needed for driving of the image display device 1. The data storage section 432 is configured to include a resolution storage section 4321, a cumulative drive time storage section 4322, and a display mode storage section 4323. The resolution storage section 4321 stores information about the resolution of each of the liquid crystal panels 212, and the cumulative drive time storage section 4322 stores information about the cumulative drive time of each of the optical engines 21, i.e., the cumulative drive time of the liquid crystal panel 212, and the cumulative illumination time of the light source device 211. The display mode storage section 4323 stores information about the display mode of each of the optical engines 21.

The display mode denotes the state of an optical image to be formed by each of the optical engines 21, e.g., brightness and color tone. When the display mode is of "presentation mode", for example, the resulting optical image will be high in intensity. When the display mode is of "cinema mode", for example, the resulting optical image will be low in intensity but high in contrast. With a setting of such a display mode, optical elements configuring the optical engine 21, e.g., cinema filter, are inserted and removed onto/from the optical path of the luminous fluxes emitted from the light source device 211 so that the optical elements function. Such a display mode includes not only the "presentation mode" and the "cinema mode" but also a "living mode" of generating an optical image having the intensity of an intermediate level between the above two modes, and others.

Figure 6:
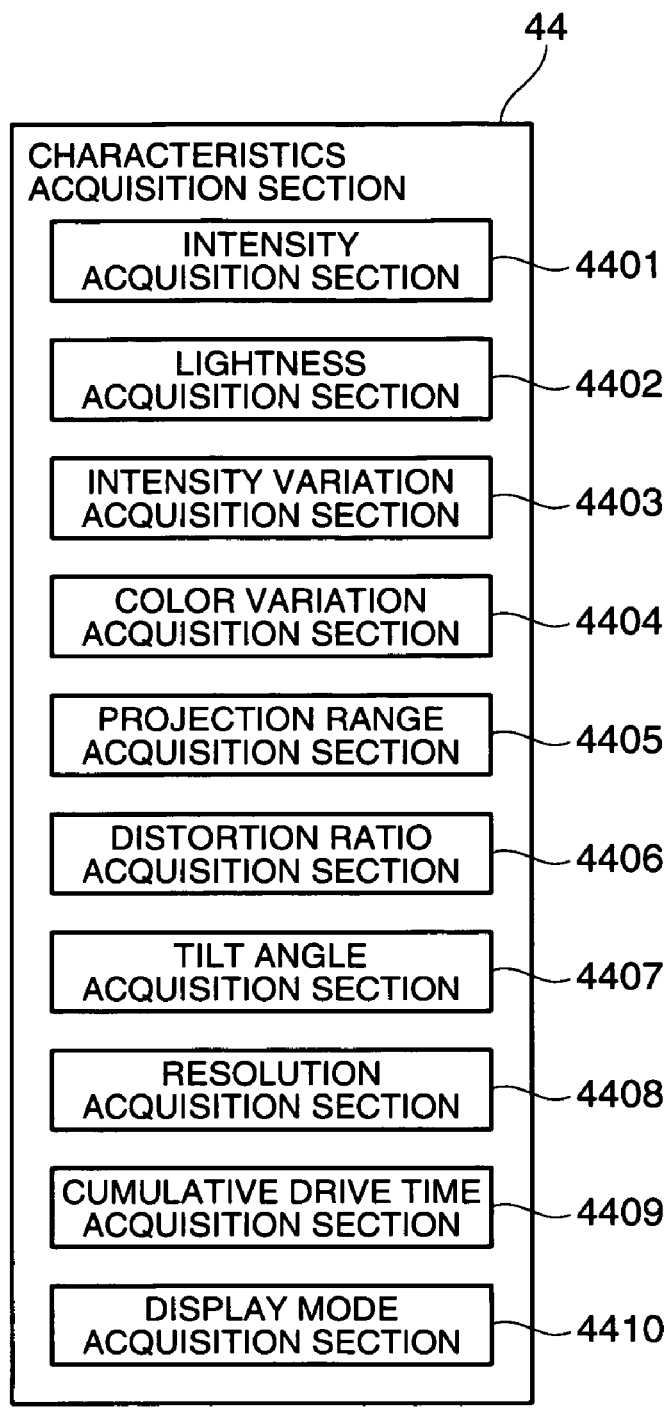
FIG. 6 is a block diagram showing the configuration of a characteristics acquisition section in accordance with a first embodiment.

FIG. 6 is a block diagram showing the configuration of the characteristics acquisition section 44.

The characteristics acquisition section 44 acquires the characteristics of the optical images P1 and P2 formed by the optical engines 21. Specifically, based on the captured images acquired by the captured image acquisition section 42, the characteristics acquisition section 44 acquires the image characteristics of the optical images P1 and P2 of the captured images, and acquires the characteristics of the optical images P1 and P2 based on the various types of information stored in the storage section 43.

Such a characteristics acquisition section 44 is configured to include an intensity acquisition section 4401, a lightness acquisition section 4402, an intensity variation acquisition section 4403, a color variation acquisition section 4404, a projection range acquisition section 4405, a distortion ratio acquisition section 4406, a tilt angle acquisition section 4407, a resolution acquisition section 4408, a cumulative drive time acquisition section 4409, and a display mode acquisition section 4410.

The intensity acquisition section 4401 and the lightness acquisition section 4402 acquire, respectively, the intensity and lightness of the optical images P1 and P2 from the captured images acquired by the CCD camera 3. Specifically, the intensity acquisition section 4401 and the lightness acquisition section 4402 acquire, respectively, an average intensity and lightness of the optical images P1 and P2. When the intensity acquisition section 4401 acquires the average intensity of each of the optical images P1 and P2, the optical engines 21 each form an optical image of gray scale, and the optical image of gray scale is captured by the CCD camera 3.

The intensity variation acquisition section 4403 and the color variation acquisition section 4404 acquire, from each of the captured images, the occurrence frequency of an intensity variation and that of a color variation of each of the optical images P1 and P2.

The projection range acquisition section 4405 acquires the projection range from the captured images for each of the optical images P1 and P2 on the projection surface of the screen or others, and from the acquired projection ranges, acquires the dimension of the optical images P1 and P2.

The distortion ratio acquisition section 4406 acquires, from each of the captured images, a distortion ratio for each of the optical images P1 and P2. Assuming that the optical images P1 and P2 to be projected are each having an aspect ratio of 16:9, the distortion ratio acquisition section 4406 acquires the distortion ratio for the captured images of the optical images. Note here that, alternatively, the distortion ratio acquisition section 4406 may acquire the distortion ratio for each of the captured images with an assumption that the optical images P1 and P2 each have an aspect ratio of 4:3.

The tilt angle acquisition section 4407 acquires a tilt angle for each of the optical images P1 and P2 in the direction along which the image-capturing pixels configuring the CCD camera 3 are aligned from each of the captured images. Specifically, in this embodiment, as described in the foregoing, the image-capturing pixels of the CCD camera 3 are aligned in matrix along the horizontal direction and the vertical direction being orthogonal to the horizontal direction. As such, the tilt angle acquisition section 4407 acquires, based on each of the captured images, the angle of intersection between the horizontal direction being the alignment direction of the image-capturing pixels and the longitudinal direction of the optical images P1 and P2, thereby acquiring the tilt angle for each of the optical images P1 and P2.

Figure 7:
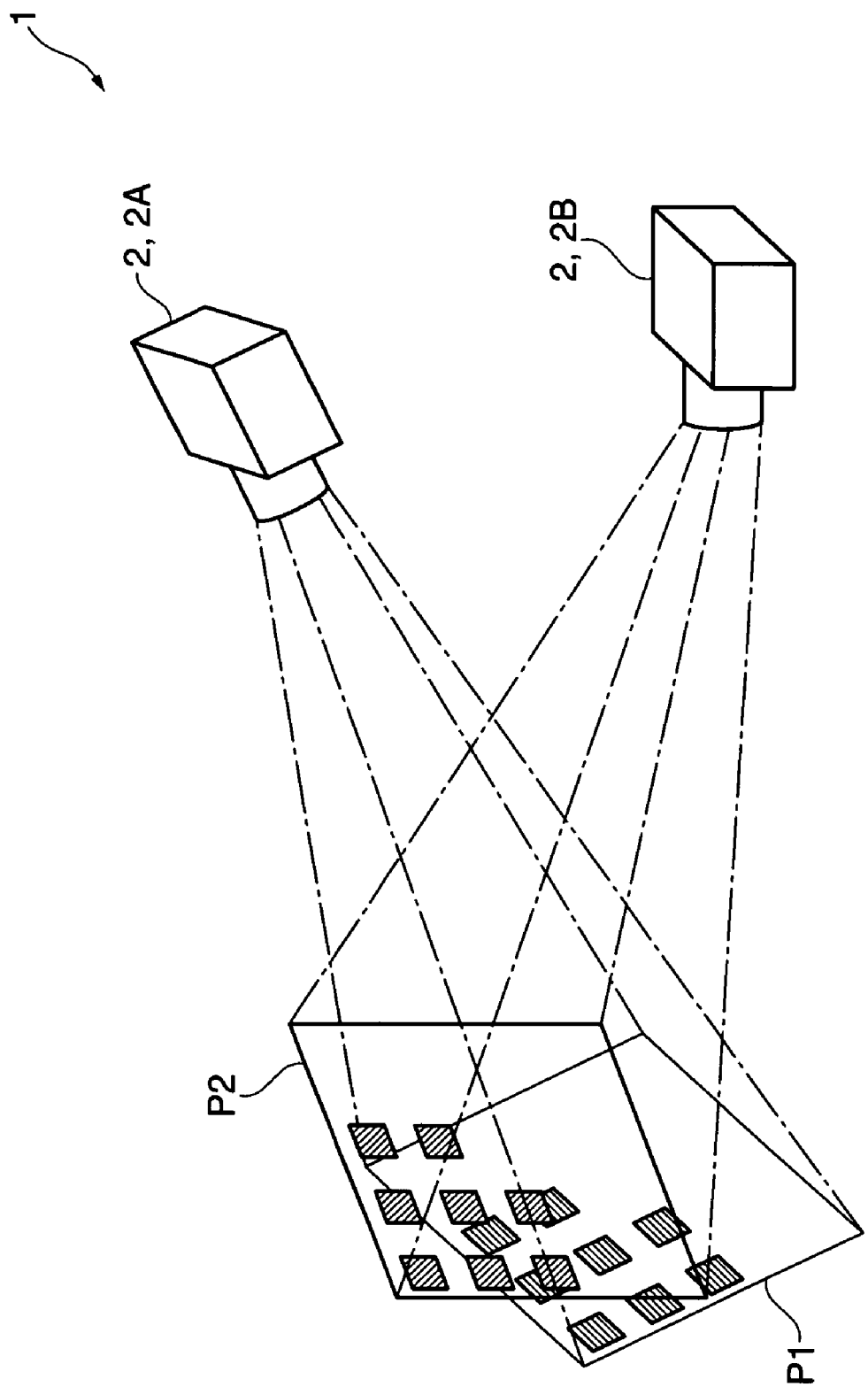
FIG. 7 is a diagram showing the state in which an optical image is tilted in accordance with a first embodiment.
Figure 8:
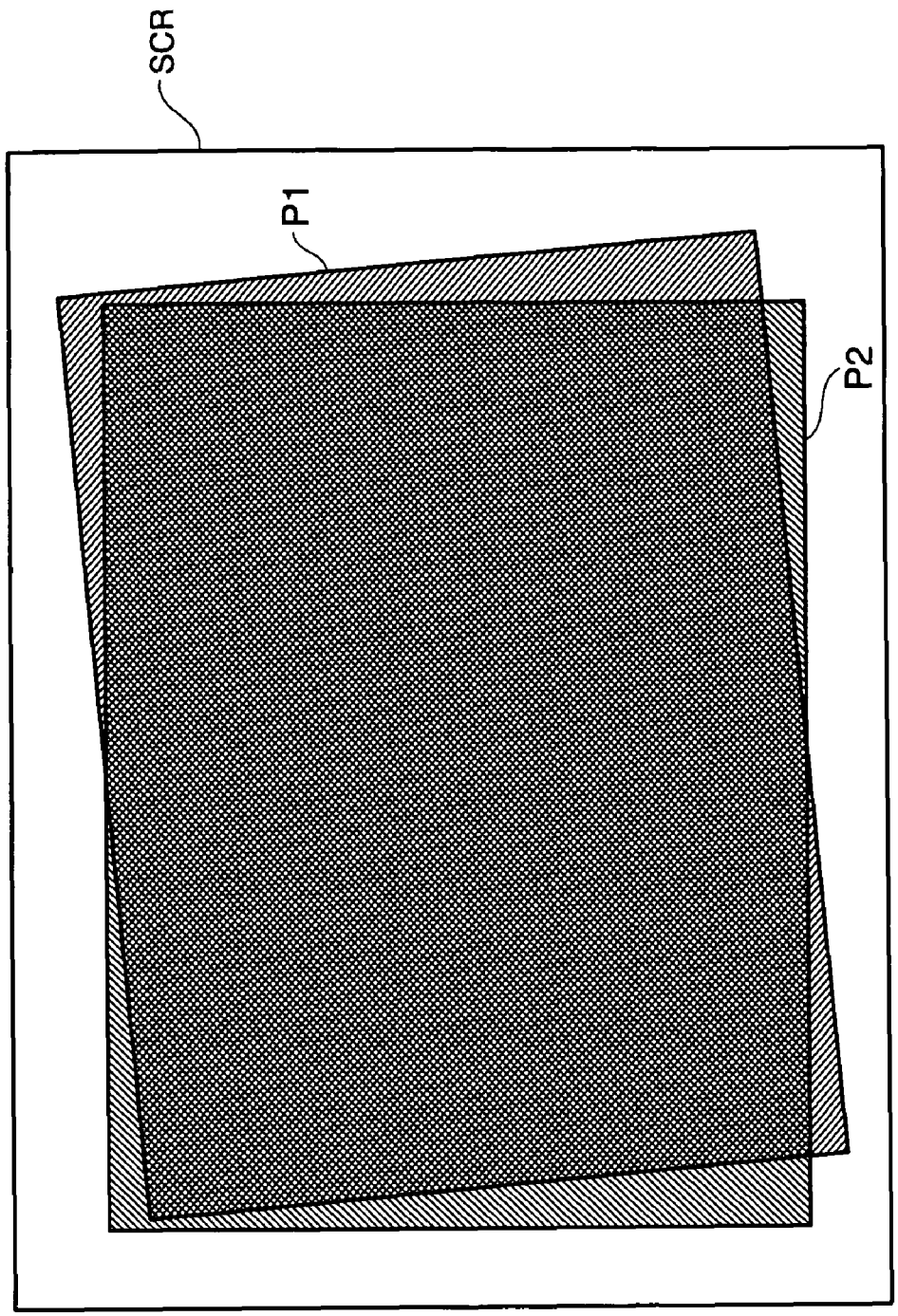
FIG. 8 is another diagram showing the state in which one optical image is tilted in accordance with a first embodiment.

FIG. 7 is a diagram showing the state in which the optical image P1 projected by the image display section 2A is tilted against the optical image P2 projected by the image display section 2B. FIG. 8 is a diagram showing the state in which the optical image P1 projected onto a screen SCR is tilted but not the optical image P2 projected also onto the screen SCR. Note that, in FIG. 7, the CCD camera 3 and the control unit 4 are not shown.

As shown in FIGS. 7 and 8, when the longitudinal direction of the optical image P2 projected from the image display section 2B is along the horizontal direction, for example, the tilt angle of the captured image of the optical image P2 is 0°. When the longitudinal direction of the optical image P1 projected from the image display section 2A has an angle of 6° with respect to the horizontal direction, for example, the tilt angle of the captured image of the optical image P1 is 6°.

Referring back to FIG. 6, the components, i.e., the resolution acquisition section 4408, the cumulative drive time acquisition section 4409, and the display mode acquisition section 4410, respectively acquire the characteristics stored in the data storage section 432 of the storage section 43 for each of the optical engines 21. Specifically, the resolution acquisition section 4408 acquires the resolution information stored in the resolution storage section 4321 about the resolution of each of the liquid crystal panels 212, and the cumulative drive time acquisition section 4409 acquires the cumulative drive time stored in the cumulative drive time storage section 4322 for each of the optical engines 21. The display mode acquisition section 4410 acquires the display mode stored in the display mode storage section 4323 for the current optical engine 21.

Figure 9:
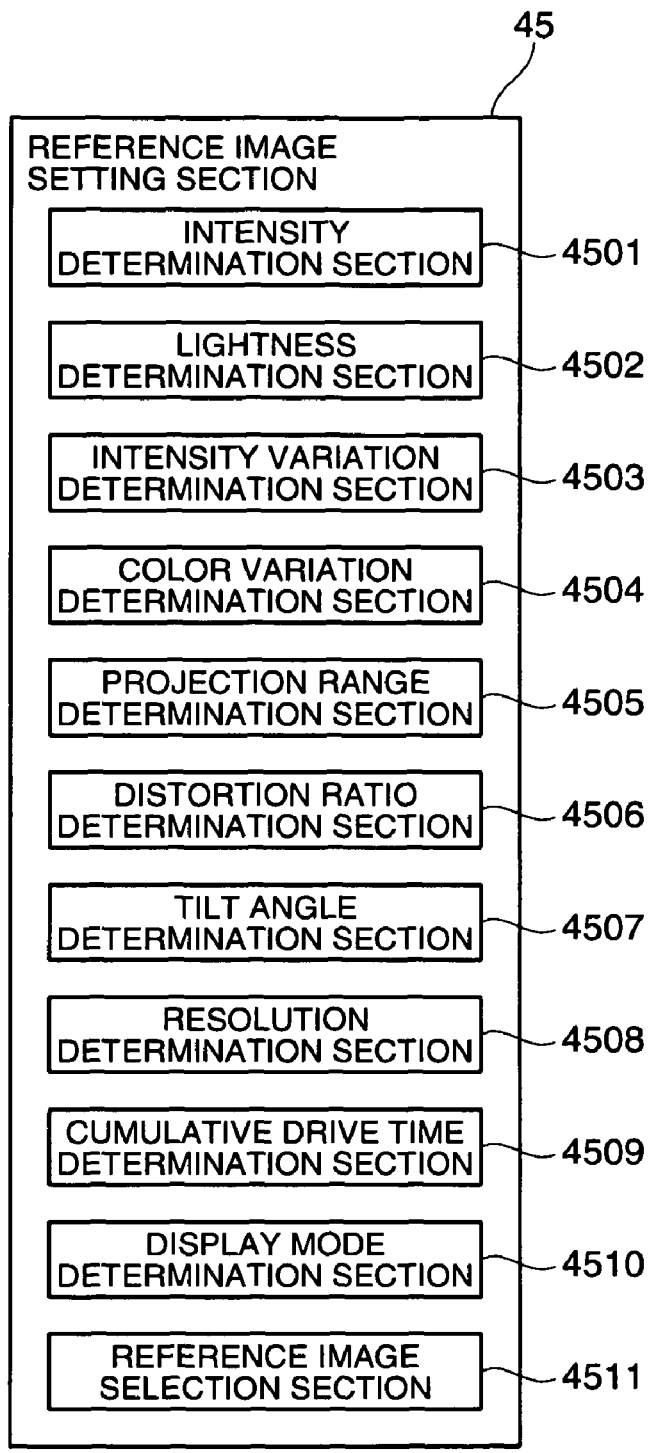
FIG. 9 is a block diagram showing the configuration of a reference image setting section in accordance with a first embodiment.

FIG. 9 is a block diagram showing the configuration of the reference image setting section 45.

The reference image setting section 45 sets a reference image for use to adjust the positions of the optical images P1 and P2. This setting is made based on the characteristics of the optical images P1 and P2 acquired by the characteristics acquisition section 44. Specifically, the reference image setting section 45 determines the characteristics of each of the optical images P1 and P2, and selects, for use as a reference image, either the optical image P1 or P2 whichever easier for recognition of the pixel positions, or whichever easier for position adjustment of the optical images P1 and P2.

As shown in FIG. 9, the reference image setting section 45 is configured to include an intensity determination section 4501, a lightness determination section 4502, an intensity variation determination section 4503, a color variation determination section 4504, a projection range determination section 4505, a distortion ratio determination section 4506, a tilt angle determination section 4507, a resolution determination section 4508, a cumulative drive time determination section 4509, a display mode determination section 4510, and a reference image selection section 4511.

The intensity determination section 4501 determines the size of a difference of average intensity between the optical images P1 and P2 acquired by the intensity acquisition section 4401 of the characteristics acquisition section 44.

The lightness determination section 4502 determines the size of a difference of average lightness between the optical images P1 and P2 acquired by the lightness acquisition section 4402.

The intensity variation determination section 4503 determines the size of a difference of occurrence frequency of an intensity variation between the optical images P1 and P2 acquired by the intensity variation acquisition section 4403.

The color variation determination section 4504 determines the size of a difference of occurrence frequency of a color variation between the optical images P1 and P2 acquired by the color variation acquisition section 4404.

The projection range determination section 4505 determines the size of a difference of dimension between the optical images P1 and P2 acquired by the projection range acquisition section 4405.

The distortion ratio determination section 4506 determines the size of a difference of distortion ratio between the optical images P1 and P2 acquired by the distortion ratio acquisition section 4406.

The tilt angle determination section 4507 determines the size of a difference of tilt angle between the optical images P1 and P2 acquired by the tilt angle acquisition section 4407.

That is, the components, i.e., the intensity determination section 4501, the lightness determination section 4502, the intensity variation determination section 4503, the color variation determination section 4504, the projection range determination section 4505, the distortion ratio determination section 4506, and the tilt angle determination section 4507, respectively determine whether a difference of characteristics between the optical images P1 and P2 is larger than a predetermined value or not.

The resolution determination section 4508 compares the liquid crystal panels 212 in terms of a resolution acquired by the resolution acquisition section 4408.

The cumulative drive time determination section 4509 compares the optical engines 21 in terms of a cumulative drive time acquired by the cumulative drive time acquisition section 4409.

The display mode determination section 4510 determines whether or not the optical engines 21 related to the optical images P1 and P2 are in the same display mode acquired by the display mode acquisition section 4410.

The reference image selection section 4511 selects either the optical image P1 or P2 for use as a reference image for position adjustment of the optical images P1 and P2. This selection is made based on the determination results derived by the components 4501 to 4510, and thus selected optical image is set as a reference image. Note that the characteristics priority determined for the optical image at the time of setting of a reference image by the reference image selection section 4511 will be described later in a display position adjustment process, which will be described later in detail.

Referring back to FIG. 3, the position change unit control section 46 outputs a control signal to one of the image display sections 2, which is equipped with the optical engine 21 forming an optical image for use to derive position alignment with a reference image set by the reference image setting section 45. Specifically, the position change unit control section 46 outputs a control signal to the position change unit 22 of the image display section 2. The position change unit 22 then moves an optical image formed through projection by the optical engine 21 of the image display section 2 for alignment of pixels with the optical image being a reference image.

Display Position Adjustment Process

Figure 10:
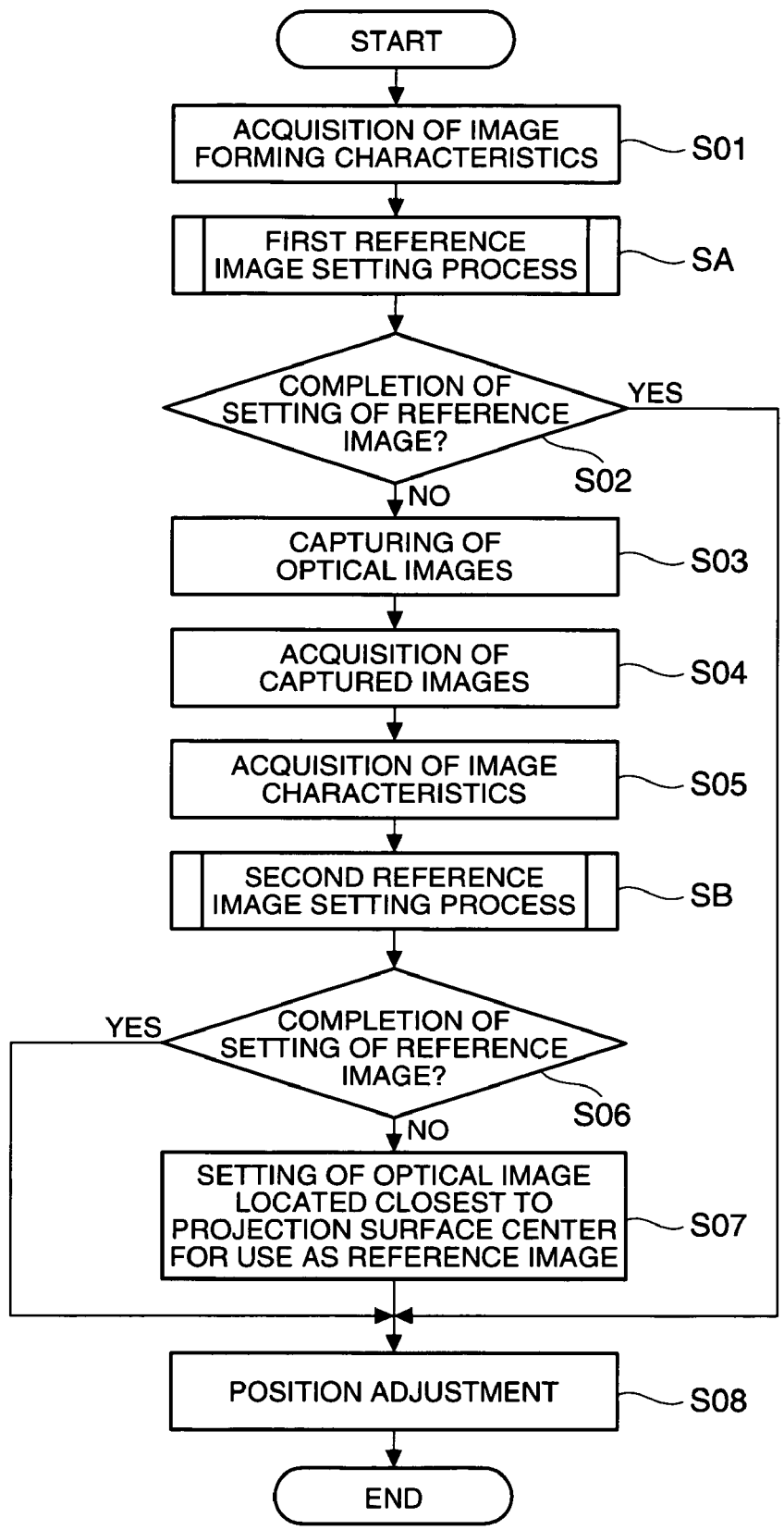
FIG. 10 is a flowchart of a display position adjustment process in accordance with a first embodiment.

FIG. 10 is a flowchart of a display position adjustment process to be executed by the control unit 4.

For adjusting the position of an optical image to be projected by each of the image display sections 2 (2A and 2B), the control unit 4 runs a display position adjustment program stored in the program storage section 431 of the storage section 43 configuring the control unit 4. Through such program running, the display position adjustment process below is executed. In this display position adjustment process, in accordance with the characteristics of each of the optical images acquired by the characteristics acquisition section 44, the reference image setting section 45 selects any one of the optical images for use as a reference image. The position change unit control section 46 then uses the position change unit 22 of each of the image display sections 2 to move and adjust the optical images in such a manner as to derive alignment of pixels with the reference image.

As shown in FIG. 10, with this display position adjustment process, the characteristics acquisition section 44 of the control unit 4 acquires image forming characteristics indicated by various information stored in the storage section 43, i.e., characteristics acquisition step S01. Specifically, the components in the characteristics acquisition section 44, i.e., the resolution acquisition section 4408, the cumulative drive time acquisition section 4409, and the display mode acquisition section 4410, respectively acquire information from the components in the data storage section 432, i.e., the resolution storages section 4321, the cumulative drive time storage section 4322, and the display mode storage section 4323. The information is about the resolution of each of the liquid crystal panels 212, and the cumulative drive time and the display mode of each of the optical engines 21.

Thereafter, the control unit 4 goes through a first reference image setting process SA.

First Reference Image Setting Process

Figure 11:
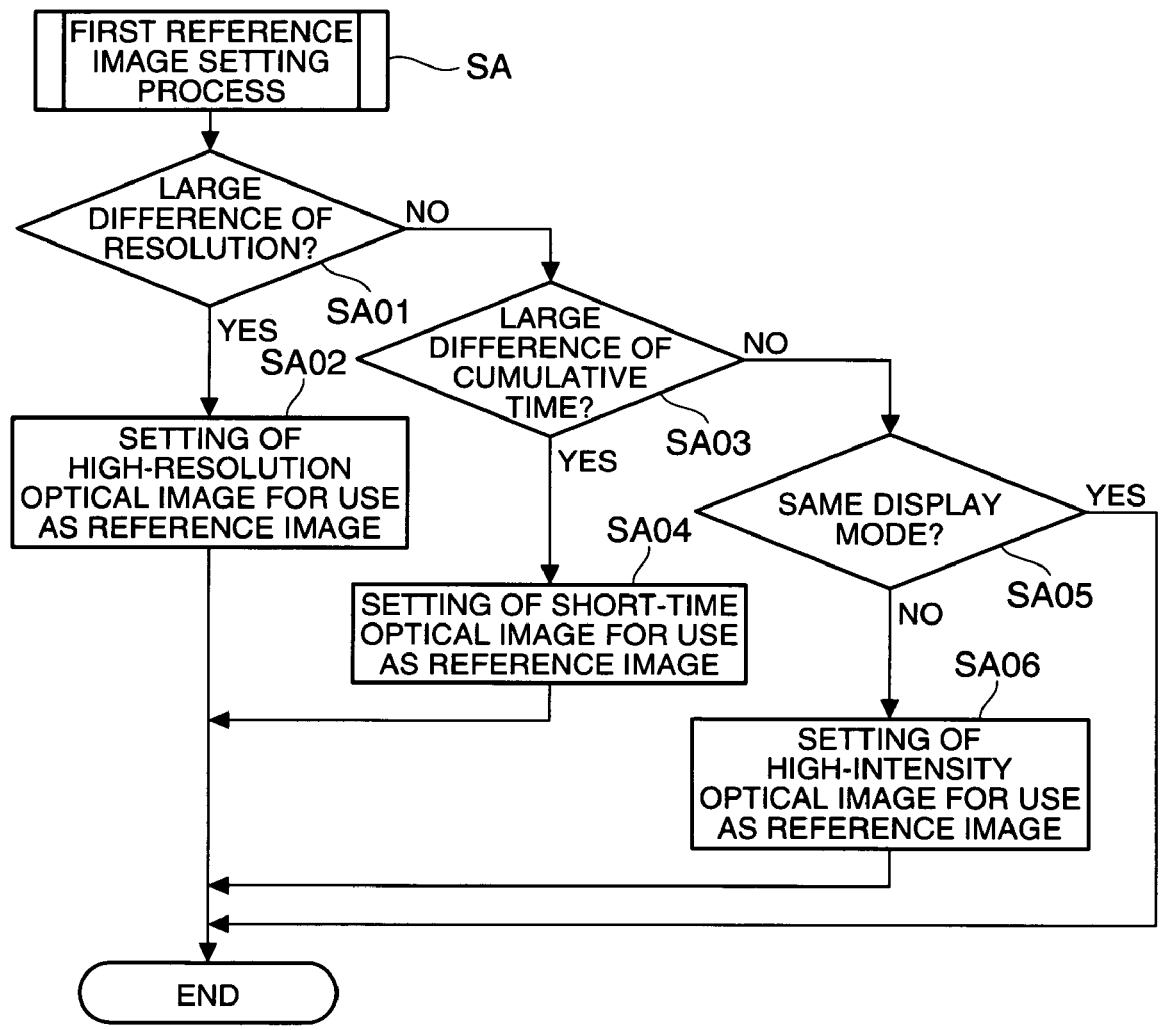
FIG. 11 is a flowchart of a first reference image setting process in accordance with a first embodiment.

FIG. 11 is a flowchart of the first reference image setting process SA in accordance with certain embodiments.

In the first reference image setting process SA, either the optical image P1 or P2 both formed by the optical engines 21 may be selected for use as a reference image. This setting is made based on the image forming characteristics of each of the optical engines 21 indicated by various information stored in the data storage section 432 of the storage section 43. That is, the first reference image setting process SA corresponds to the selecting and the first reference image setting process.

Specifically, in the first reference image setting process SA, as shown in FIG. 11, the resolution determination section 4508 of the reference image setting section 45 compares the liquid crystal panels 212 forming the optical images P1 and P2 in terms of the resolution acquired by the resolution acquisition section 4408, i.e., resolution determination step SA01.

When the resolution determination section 4508 determines that the difference of resolution is larger than a predetermined value, the reference image selection section 4511 sets, for use as a reference image, the optical image formed by the liquid crystal panel 212 showing a larger value for the resolution, i.e., first reference image setting step SA02, and this is the end of the first reference image setting process SA.

On the other hand, when the resolution determination section 4508 determines that the difference of resolution between the liquid crystal panels 212 related to the optical images P1 and P2 is equal to or smaller than a predetermined value, the cumulative drive time determination section 4509 determines the size of a difference of cumulative drive time acquired for the optical engines 21, i.e., cumulative drive time determination step SA03.

When the cumulative drive time determination section 4509 determines that the difference of cumulative drive time related to the optical images P1 and P2 is larger than the predetermined value, the reference image selection section 4511 sets, for use as a reference image, the optical image formed by the optical engine 21 showing a smallest value for the cumulative drive time, i.e., the first reference image setting step SA04, and this is the end of the first reference image setting process SA.

On the other hand, when the cumulative drive time determination section 4509 determines that the difference of cumulative drive time between the optical images P1 and P2 is equal to or smaller than the predetermined value, the display mode determination section 4510 determines whether or not the acquired optical images P1 and P2 are in the same display mode, i.e., the display mode determination step SA05.

When the display mode determination section 4510 determines that the optical images P1 and P2 are not in the same display mode, the reference image selection section 4511 selects, for use as a reference image, any of the optical images formed by the optical engine 21 currently in the display mode with which the resulting optical image is increased in intensity, i.e., the first reference image setting step SA06, and this is the end of the first reference image setting process SA.

Note that, in this embodiment, the reference image selection section 4511 determines the "presentation mode" as being the easiest for recognition of pixel positions in the optical images. With the "presentation mode", the intensity shows a highest value. In the description below, the display mode resulting in the higher intensity is considered as being easier for recognition of pixel positions in the optical images.

On the other hand, when the display mode determination section 4501 determines that the optical images P1 and P2 are in the same display mode, the reference image setting section 45 ends the first reference image setting process SA without performing the setting of a reference image.

After the first reference image setting process SA as such, as shown in FIG. 10, the control unit 4 determines whether the setting of a reference image is completed by the reference image setting section 45 or not, i.e., completion determination step S02. When the determination result by the control unit 4 is Yes, i.e., the setting of a reference image is completed, the procedure goes to step S08 that will be described later.

When the determination result by the control unit 4 is No, i.e., the setting of a reference image is not yet completed, the image output section 41 forwards image information related to a pattern image to the image display sections 2A and 2B with a predetermined length of interval. The CCD camera 3 serving as the image capturing unit then captures, separately, optical images formed through projection by the image display sections 2A and 2B, i.e., image capturing step S03.

Next, the captured image acquisition section 42 acquires image information about the optical images P1 and P2 from the images captured by the CCD camera 3, i.e., captured image acquisition step S04.

Thereafter, the components in the characteristics acquisition section 44, i.e., the intensity acquisition section 4401, the lightness acquisition section 4402, the intensity variation acquisition section 4403, the color variation acquisition section 4404, the projection range acquisition section 4405, the distortion ratio acquisition section 4406, and the tilt angle acquisition section 4408, respectively acquire, for each of the optical images P1 and P2, the image characteristics from the image information acquired for each of the optical images P1 and P2, i.e., image characteristics acquisition step S05.

Thereafter, the reference image setting section 45 of the control unit 4 goes through a second reference image setting process SB.

Second Reference Image Setting Process

Figure 12:
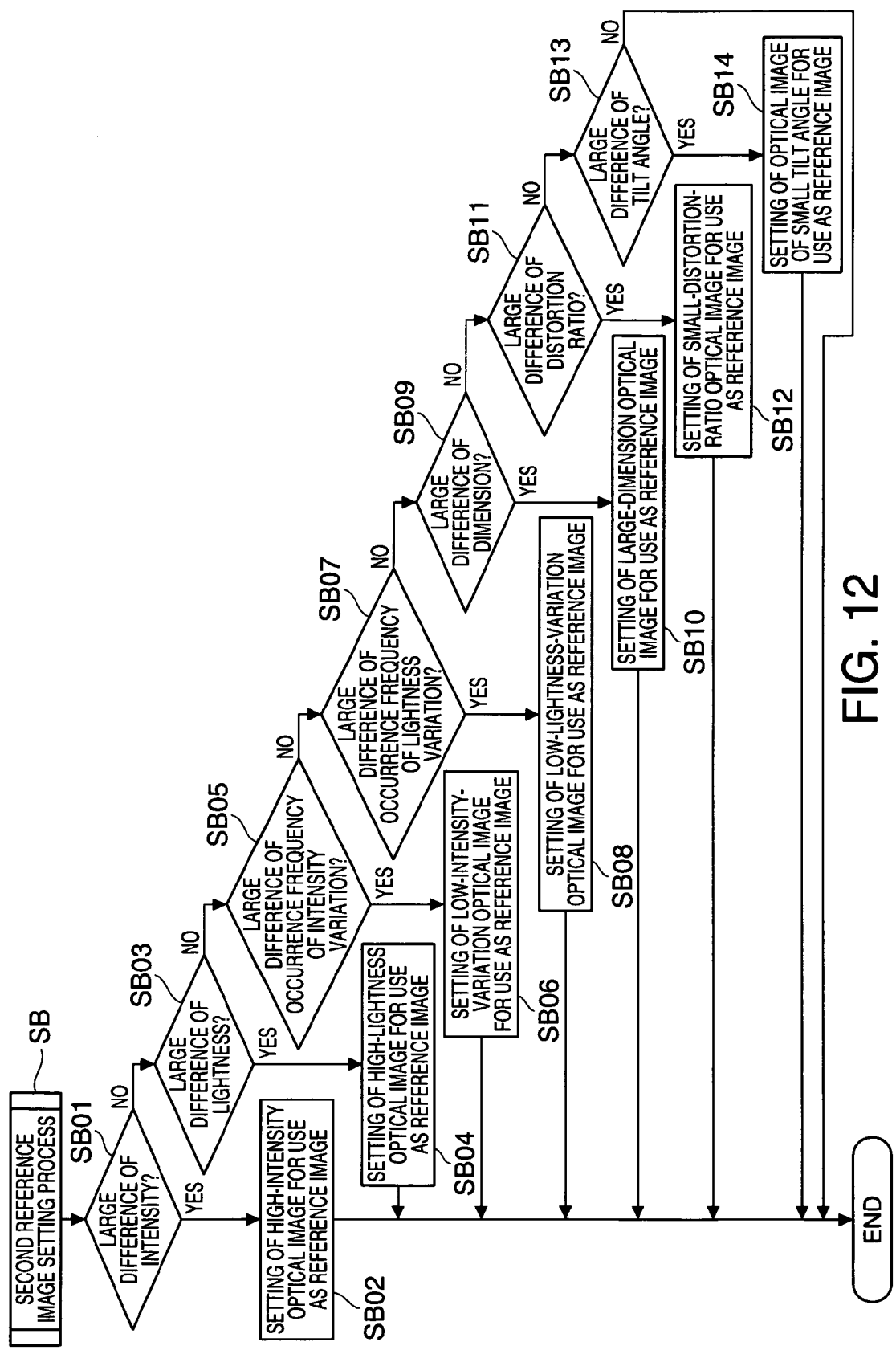
FIG. 12 is a flowchart of a second reference image setting process in accordance with a first embodiment.

FIG. 12 is a flowchart of the second reference image setting process SB.

In the second reference image setting process SB, based on the image characteristics of the optical images P1 and P2 acquired by the characteristics acquisition section 44, one of the optical images P1 and P2 formed by the optical engines 21 may be set for use as a reference image. That is, the second reference image setting process SB corresponds to the selecting and the second reference image setting process.

As shown in FIG. 12, in this second reference image setting process SB, the intensity determination section 4501 of the reference image setting section 45 compares the acquired optical images P1 and P2 in terms of average intensity, i.e., intensity determination step SB01.

When the determination result by the intensity determination section 4501 is Yes, i.e., the difference of average intensity between the optical images P1 and P2 is larger than a predetermined value, the reference image selection section 4511 then sets, for use as a reference image, either the optical image P1 or P2 whichever showing a higher value for the average intensity, i.e., second reference image setting step SB02, and this is the end of the second reference image setting process SB.

On the other hand, when the determination result by the intensity determination section 4501 is No, i.e., the difference of average intensity between the optical images P1 and P2 is equal to or smaller than the predetermined value, the lightness determination section 4502 compares the optical images P1 and P2 in terms of average lightness, i.e., lightness determination step SB03.

When the lightness determination section 4502 determines that the difference of average lightness between the optical images P1 and P2 is larger than a predetermined value, the reference image selection section 4511 then sets, for use as a reference image, either the optical image P1 or P2 whichever showing a higher value for the average lightness, i.e., second reference image setting step SB04, and this is the end of the second reference image setting process SB.

When the lightness determination section 4502 determines that the difference of average lightness between the optical images P1 and P2 is equal to or smaller than the predetermined value, the intensity variation determination section 4503 then determines the size of a difference of occurrence frequency of an intensity variation between the optical images P1 and P2, i.e., intensity variation determination step SB05.

When the intensity variation determination section 4503 determines that the difference of occurrence frequency of the intensity variation between the optical images P1 and P2 is larger than a predetermined value, the reference image selection section 4511 then sets, for use as a reference image, either the optical image P1 or P2 whichever showing a smallest value for the occurrence frequency of the intensity variation, i.e., second reference image setting step SB06, and this is the end of the second reference image setting process SB.

On the other hand, when the intensity variation determination section 4503 determines that the difference of occurrence frequency of the intensity variation between the optical images P1 and P2 is equal to or smaller than the predetermined value, the color variation determination section 4504 determines the size of a difference of occurrence frequency of a lightness variation between the optical images P1 and P2, i.e., lightness variation determination step SB07.

When the color variation determination section 4504 determines that the difference of occurrence frequency of the lightness variation between the optical images P1 and P2 is larger than a predetermined value, the reference image selection section 4511 then sets, for use as a reference image, either the optical image P1 or P2 whichever showing a lowest value for the occurrence frequency of the lightness variation, i.e., second reference image setting step SB08, and this is the end of the second reference image setting process SB.

On the other hand, when the color variation determination section 4504 determines that the difference of occurrence frequency of the intensity variation between the optical images P1 and P2 is equal to or smaller than the predetermined value, based on the projection range for the acquired optical images P1 and P2, the projection range determination section 4505 compares the optical images P1 and P2 in terms of the size of the projection range, i.e., dimension determination step SB09.

When the projection range determination section 4505 determines that the difference of dimension of the projection range between the optical images P1 and P2 is larger than a predetermined value, the reference image selection section 4511 then sets, for use as a reference image, either the optical image P1 or P2 whichever showing a largest value for the dimension of the projection range, i.e., second reference image setting step SB10, and this is the end of the second reference image setting process SB. Note that, in this embodiment, the reference image selection section 4511 sets, for use as a reference image, the optical image having the larger dimension for the projection range. This is surely not restrictive, and any optical image having the smaller dimension for the projection range may be set for use as a reference image.

On the other hand, when the projection range determination section 4505 determines that the difference of dimension of the projection range between the optical images P1 and P2 is equal to or smaller than a predetermined value, the distortion ratio determination section 4506 then compares the optical images P1 and P2 in terms of a distortion ratio, i.e., distortion ratio determination step SB11.

When the distortion ratio determination section 4506 determines that the difference of distortion ratio between the optical images P1 and P2 is larger than a predetermined value, the reference image selection section 4511 then selects, for use as a reference image, any of the captured images whichever showing a lowest value for the distortion ratio, i.e., second reference image setting step SB12, and this is the end of the second reference image setting process SB.

On the other hand, when the distortion ratio determination section 4506 determines that the difference of distortion ratios between the optical images P1 and P2 is equal to or smaller than the predetermined value, the tilt angle determination section 4507 then compares the optical images P1 and P2 in terms of a tilt angle, i.e., tilt angle determination step SB13.

When the tilt angle determination section 4507 determines that the difference of tilted angle between the optical images P1 and P2 is larger than a predetermined value, the reference image selection section 4511 then sets, for use as a reference image, either the optical image P1 or P2 whichever showing a smaller value for the tilt angle, i.e., second reference image setting step SB14, and this is the end of the second reference image setting process SB.

On the other hand, when the tilt angle determination section 4507 determines that the difference of tilted angle between the optical images P1 and P2 is equal to or smaller than the predetermined value, the reference image selection section 4511 then ends the second reference image setting process SB without performing the setting of a reference image.

By referring back to FIG. 10, when the second reference image setting process SB is completed, similarly to step S02 described above, the control unit 4 determines whether the setting of a reference image is completed or not by the reference image setting section 45, i.e., completion determination step S06.

When the determination result by the control unit 4 is Yes, i.e., the setting of a reference image is completed, the procedure goes to step S08, which will be described later.

On the other hand, when the determination result by the control unit 4 is No, i.e., the setting of a reference image is not yet completed, the reference image selection section 4511 of the reference image setting section 45 sets, for use as a reference image, based on the projection ranges of the optical images P1 and P2 acquired by the projection range acquisition section 4405, either the optical image P1 or P2 whose center is closer to the center of the projection surface of a screen or others, i.e., third reference image setting step S07. This setting is made. Thereafter, the procedure for the control unit 4 moves to step S08.

In step S08, the position change unit control section 46 outputs a control signal to one of the image display sections 2, which is not the one forming, through projection, the optical image set for use as a reference image. In the image display section 2 receiving the control signal, the position change unit 22 moves the optical image formed by the optical engine 21 therein, i.e., position adjustment step S08. This position change is so performed as to derive alignment of pixels with the optical image being the reference image. At this time, the position change unit control section 46 outputs a control signal while checking, using the CCD camera 3, the position of the moved optical image, thereby increasing the accuracy of position adjustment for the optical image.

This is the end of the display position adjustment process.

Note that, in this embodiment, the first reference image setting process SA is executed before the second reference image setting process SB. This order is surely not restrictive, and the order may be reversed. For example, the steps S03 to S05 and the second reference image setting process SB described above may be reversed in order with step S01 and the first reference image setting process SA.

With the image display device 1 of the first embodiment described as such, the following effects may be achieved.

Based on the image characteristics of the optical images P1 and P2 acquired by the characteristics acquisition section 44 of the control unit 4, and based on the image forming characteristics of the optical engines 21, the reference image setting section 45 sets, for use as a reference image, one of the optical images P1 and P2 formed by the image display sections 2A and 2B. Thereafter, using the position change unit 22 of one of the image display sections 2 forming the remaining optical image not set for use as the reference image, the position change unit control section 46 moves the optical image being not the reference image in such a manner as to derive alignment of pixels with the optical image being the reference image.

In this manner, even if the optical images P1 and P2 formed by the optical engines 21 are not having the same characteristics, the setting of a reference image can be performed based on the characteristics of the optical images P1 and P2. This accordingly enables to perform the setting of a reference image with appropriateness, whereby alignment of pixels can be easily derived for the optical image with respect to the reference image.

The position change unit control section 46 moves, using the position change unit 22 in one of the image display sections 2, an optical image formed by the optical engine 21 in the image display section 2. This position change is so performed as to derive an overlay, on a pixel basis, of the optical image over an optical image being a reference image. In this manner, the resulting display image can be of high intensity compared with the configuration of forming, through projection, an optical image using one image display section 2.

In the second reference image setting process SB, the characteristics acquisition section 44 of the control unit 4 acquires the image characteristics of the optical images P1 and P2 from images captured by the CCD camera 3 for the optical images. The CCD camera 3 is the one serving as the image capturing unit. This accordingly enables the reference image setting section 45 to perform the setting of a reference image based on the image characteristics of the optical images actually projected on the screen or others.

In the second reference image setting process SB, the reference image selection section 4511 of the reference image setting section 45 selects, for use as a reference image, any of the captured images showing a highest value for the average intensity. When the difference of average intensity between the optical images P1 and P2 is equal to or smaller than a predetermined value, the reference image selection section 4511 selects, for use as a reference image, any of the optical images showing a higher value for the average chromaticity. Moreover, the reference image selection section 4511 selects, for use as a reference image, any of the optical images showing a lower value for the occurrence frequency of the intensity variation and that of the color variation. The reference image selection section 4511 also selects, for use as a reference image, any of the optical images showing a smaller value for the tilt angle in the alignment direction of the image-capturing pixels of the CCD camera 3. This accordingly eases recognition of pixel positions in the optical image set for use as a reference image so that the remaining optical images can be adjusted in position with more ease by the position change unit control section 46. As such, the optical images P1 and P2 can be adjusted in position with more appropriateness and ease.

In the first reference image setting process SA, the reference image selection section 4511 of the reference image setting section 45 performs the setting of a reference image based on the resolution of each of the liquid crystal panels 212 stored in the storage section 43, and the cumulative drive time and the display mode of each of the optical engines 21. This accordingly eases recognition of pixel positions in the optical image being a reference image so that the remaining optical images can be adjusted in position with more ease and with more appropriateness with respect to the optical image being a reference image.

Moreover, in the first reference image setting process SA, the setting of a reference image is performed based on various types of information stored in the storage section 43, whereby the CCD camera 3 is not required to capture the optical images P1 and P2. As a result, the setting of a reference image can be performed more swiftly.

Second Embodiment

Described next is an image display device 1A in a second embodiment.

The image display device 1A in the second embodiment is of the configuration similar to that of the image display device 1 described above. In the image display device 1 of the first embodiment, a reference image is used as a basis for position adjustment of other optical images, i.e., in such a manner as to derive an overlay, on a pixel basis, between the optical images P1 and P2 formed by the image display sections 2A and 2B, respectively. In the image display device 1A of the second embodiment, a reference image is used as a basis for position adjustment of other optical images, i.e., in such a manner as to locate, between pixels of one optical image set for use as a reference image, a pixel of the other optical image. Note that, in the following description, any component being similar or substantially similar to that described in the first embodiment is provided with the same reference numeral, and not described again.

Figure 13:
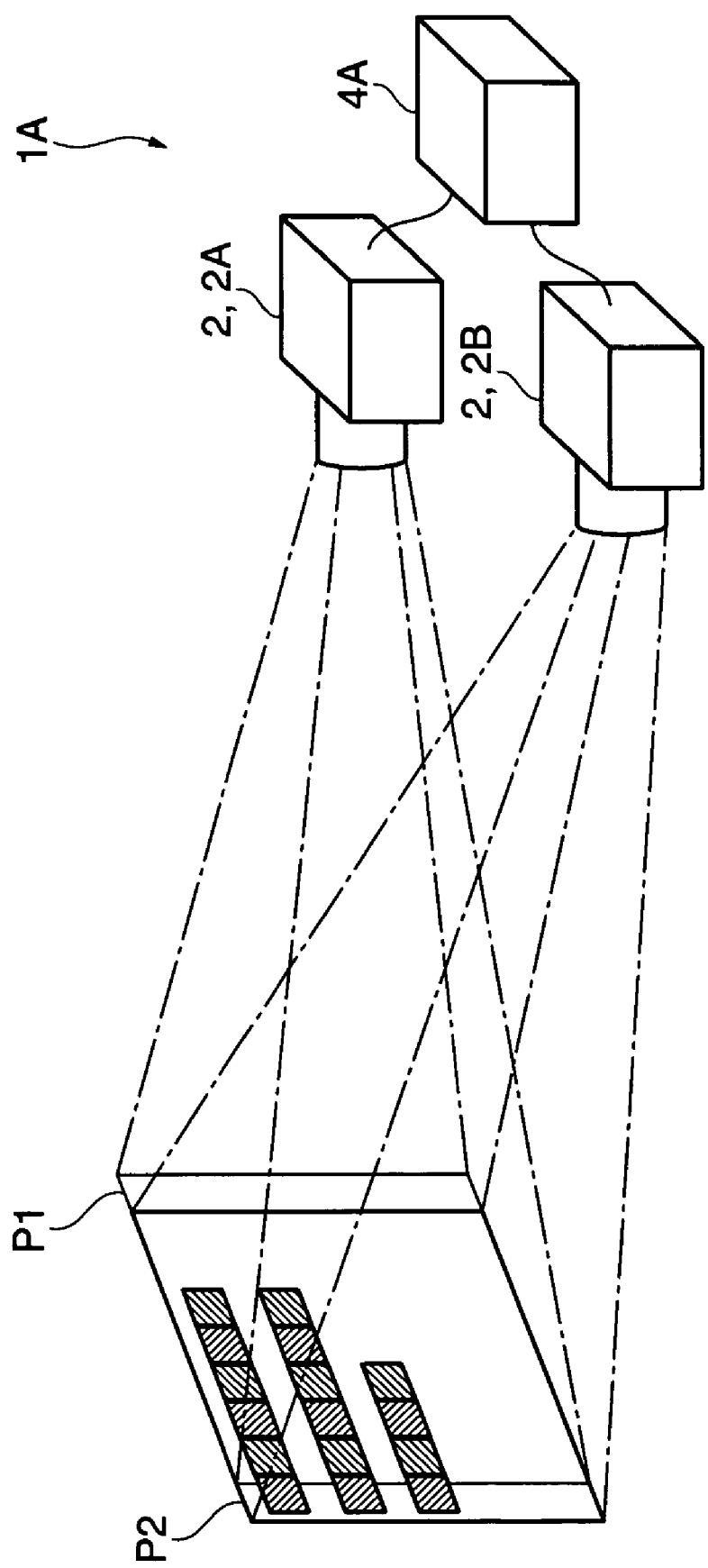
FIG. 13 is a schematic view of an image display device in accordance with a second embodiment of the invention, showing the configuration thereof.
Figure 14:
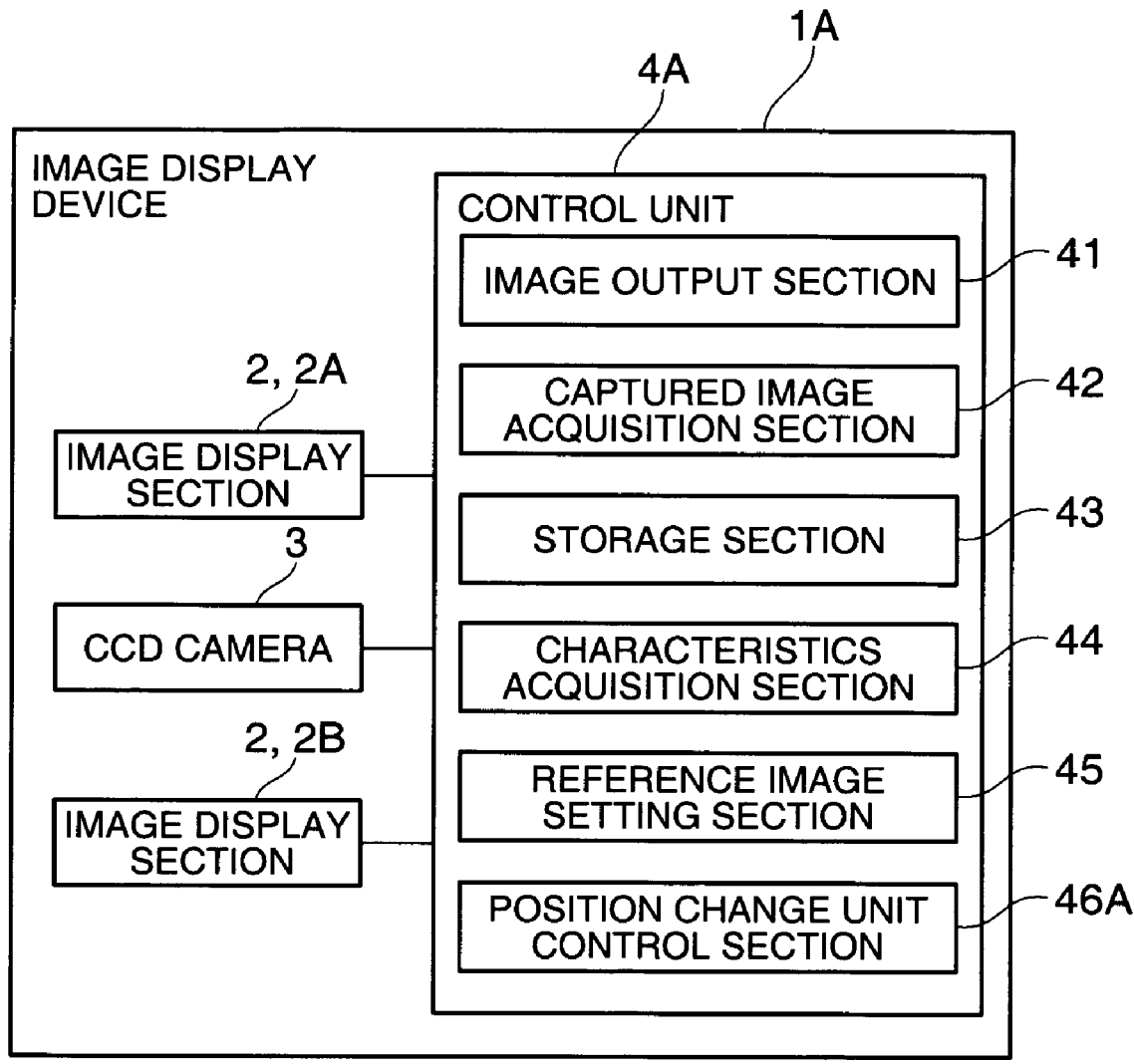
FIG. 14 is a block diagram showing the configuration of an image display device in accordance with a second embodiment.

FIG. 13 is a schematic diagram showing the configuration of the image display device 1A of the second embodiment. Specifically, FIG. 13 is a schematic view of the image display device 1A after the optical images P1 and P2 projected from the image display sections 2 (2A and 2B) are adjusted in projection position. FIG. 14 is a block diagram showing the configuration of the image display device 1A.

As shown in FIGS. 13 and 14, the image display device 1A of this embodiment is configured to include the image display sections 2 (2A and 2B), the CCD camera 3 (not shown in FIG. 13), and control unit 4A.

Among these components, the control unit 4A is configured to include the image output section 41, the captured image acquisition section 42, the storage section 43, the characteristics acquisition section 44, the reference image setting section 45, and a position change unit control section 46A.

The position change unit control section 46A outputs a control signal to one of the image display sections 2 forming an optical image, which is not the one set for use as a reference image by the reference image setting section 45. As shown in FIG. 13, using the position change unit 22 of the image display section 2, the position change unit control section 46A moves the optical image being not the reference image (the optical image P1 in FIG. 13) in such a manner that a pixel thereof is located between pixels in the optical image being the reference image (the optical image P2 in FIG. 13), i.e., at the position corresponding to the shadow portion of a black matrix.

With such an image display device 1A of this embodiment, the effects similar to those achieved by the image display device 1 in the first embodiment may be achieved and the following effects may also be achieved.

Using the position change unit 22 of the image display section 2 forming an optical image being not a reference image, the position change unit control section 46A of the control unit 4 disposes a pixel of the optical image between pixels of an optical image being a reference image. This accordingly enables to dispose pixels of the optical image being not the reference image in any area not formed with pixels in the optical image being the reference image so that the resulting image configured by the optical images P1 and P2 can be increased in definition. As such, the image display device 1A becomes able to display images of higher definition.

Third Embodiment

Described next is an image display device 1B of a third embodiment.

Unlike the image display device 1 of the first embodiment including the two image display sections 2 each provided with the optical engine 21, the image display device 1B of this embodiment is provided with a single image display section 2C, and an optical engine 21B in the image display section 2C is provided with a plurality of liquid crystal panels 212.

Figure 15:
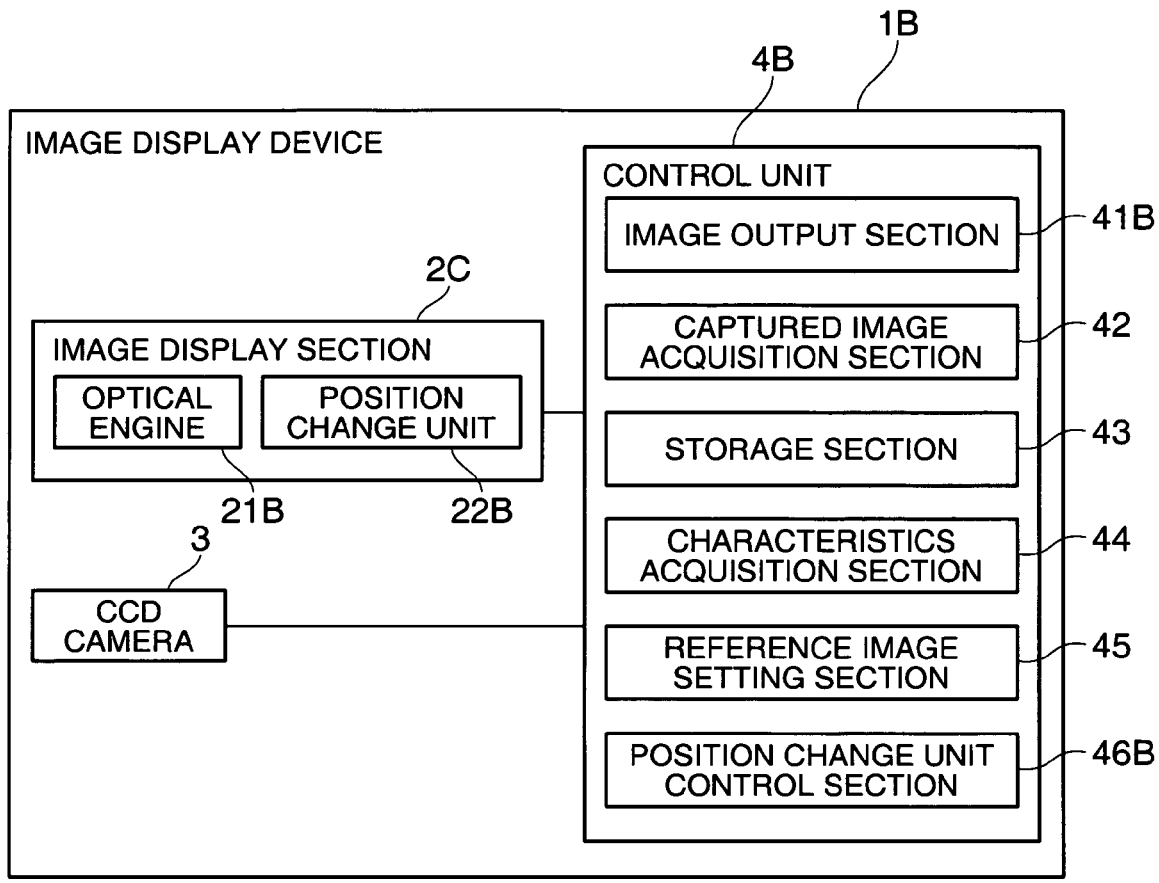
FIG. 15 is a block diagram showing the configuration of an image display device in accordance with a third embodiment.

FIG. 15 is a block diagram showing the configuration of the image display device 1B of this embodiment.

As shown in FIG. 15, the image display device 1B is configured to include the image display section 2C, the CCD camera 3, and control unit 4B.

Among these components, the image display section 2C is configured to include the optical engine 21B, and position change unit 22B. The optical engine 21B forms an optical image in accordance with image information coming from the control unit 4B, and extends and projects the optical image onto the projection surface on a screen or others.

Figure 16:
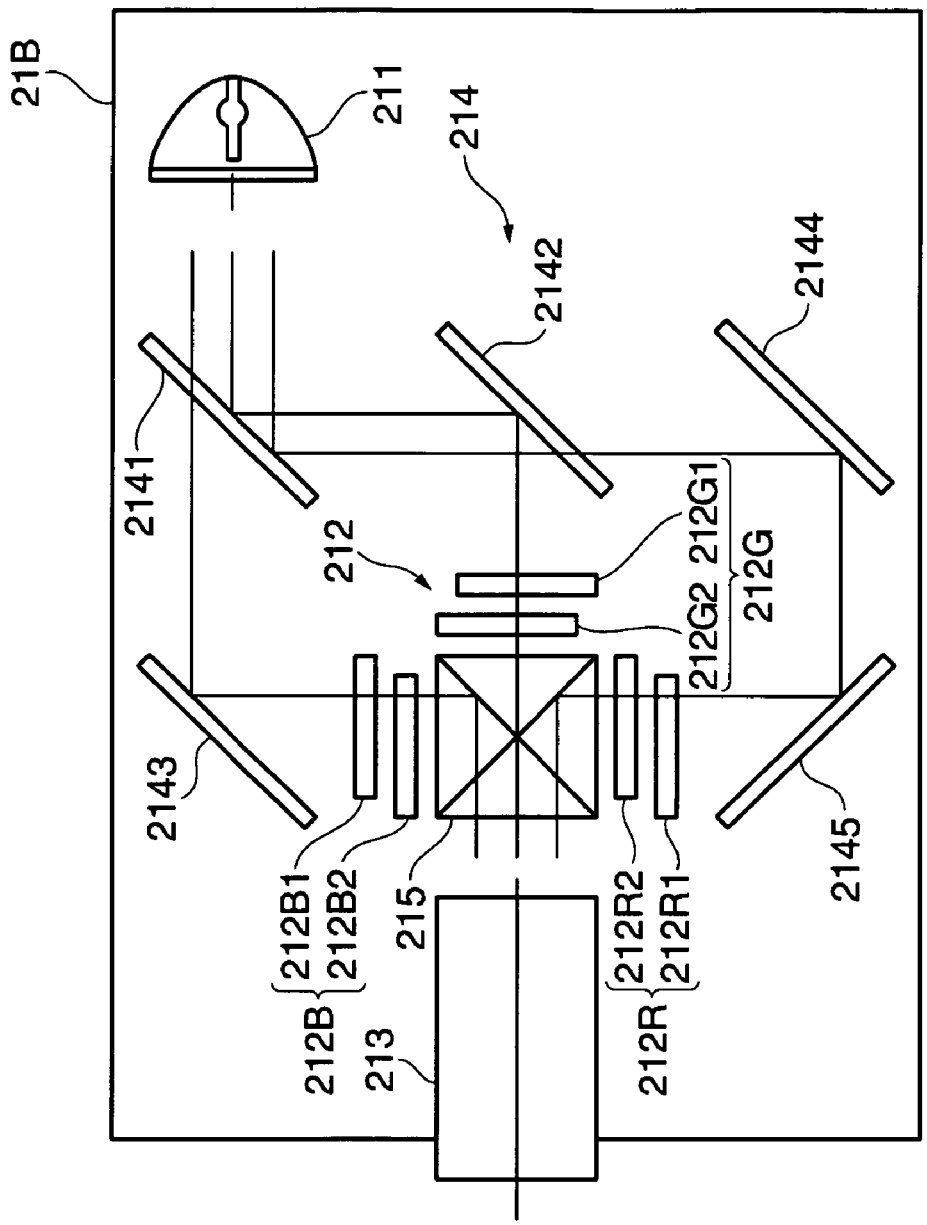
FIG. 16 is a schematic view of an optical system in an optical engine in accordance with a third embodiment.

FIG. 16 is a schematic view of an optical system in the optical engine 21B.

As shown in FIG. 16, the optical engine 21B is configured to include the light source device 211, six of the liquid crystal panels 212 each serving as a light modulation device, and the projection lens 213. The optical engine 21B is also provided with a color separation optical device 214, and a light combining optical device 215.

Among these components, the color separation optical device 214 is configured to include two dichroic mirrors 2141 and 2142, and three total reflection mirrors 2143 to 2145. Among luminous fluxes emitted from the light source device 211, the dichroic mirror 2141 passes through lights of blue, and reflects lights of red and green. Among the lights of red and green reflected by the dichroic mirror 2141, the dichroic mirror 2142 passes through the lights of red but reflects the lights of green. The dichroic mirror 2142 then directs the lights of green into the liquid crystal panel 212 (212G). The total reflection mirror 2143 reflects the lights of blue having been passed through the dichroic mirror 2141, and directs the lights of blue into the liquid crystal panel 212 (212B). The total reflection mirrors 2144 and 2145 reflect the lights of red having been passed through the dichroic mirror 2142, and directs the lights of red into the liquid crystal panel 212 (212R).

The liquid crystal panels 212, i.e., the liquid crystal panel for lights of red is denoted by 212R, the liquid crystal panel for lights of green is denoted by 212G, and the liquid crystal panel for lights of blue is denoted by 212B, are disposed two to each of the optical paths for lights of red (R), green (G), and blue (B). These liquid crystal panels 212R, 212G, and 212B include, respectively, liquid crystal panels 212R1, 212G1, and 212B1 disposed forward of the optical paths for each color of lights, and liquid crystal panels 212R2, 212G2, and 212B2 disposed rearward of the optical paths for each color of lights. The liquid crystal panels 212R1, 212G1, and 212B1 are so disposed as to have a pixel displacement with the liquid crystal panels 212R2, 212G2, and 212B2.

Note that, in this embodiment, the liquid crystal panels 212 are so set as to be the same in resolution, dimension of image formation areas, and pixel size.

The light combining optical device 215 is configured by a cross dichroic prism. This cross dichroic prism is made of four right-angle prisms attached together, and is in the square shape when viewed from the above. On the interface formed by attaching the four right-angle prisms as such, two dielectric multi-layers are formed. These dielectric multi-layers pass through lights of green via the liquid crystal panel 212G disposed on the side opposing the projection lens 213, i.e., the side of lights of green, and reflect lights of red and blue via the remaining liquid crystal panels 212R and 212B. As such, the color lights being results of modulation by the liquid crystal panels 212R, 212G, and 212B are combined together so that a color image is formed.

By referring back to FIG. 15, the position change unit 22B adjusts the liquid crystal panels 212 in position based on a control signal provided by the control unit 4B, which will be described later, thereby adjusting the positions of optical images to be formed by the liquid crystal panels 212. To be specific, the position change unit 22B adjusts the liquid crystal panels 212 in position in such a manner as to derive alignment of pixels for the liquid crystal panels 212 with respect to the liquid crystal panel 212 forming an optical image being a reference image set by the reference image setting section 45 of the control unit 4B. Such position change unit 22B is so configured as to be able to move the liquid crystal panel 212 being a moving target in the direction of an optical axis for color lights entering the liquid crystal panel 212, and in the direction orthogonal to the optical axis direction. The position change unit 22B is also so configured as to be able to rotate about the rotation axis being the orthogonal direction.

The control unit 4 is configured to include an image output section 41B, the captured image acquisition section 42, the storage section 43, the characteristics acquisition section 44, the reference image setting section 45, and a position change unit control section 46B.

Among these components, the image output section 41B forwards, to the image display section 2C, image information related to an optical image formed by each of the liquid crystal panels 212.

The position change unit control section 46B forwards a control signal to the position change unit 22B of the image display section 2C, and using the position change unit 22B, moves the liquid crystal panel 212 being a target of position adjustment. This position movement is performed based on the pixel position of the optical image being a reference image set by the reference image setting section 45.

Note here that the cumulative drive time storage section 4322 of the storage section 43 is storing the cumulative drive time of each of the liquid crystal panels 212.

With the image display device 1B, the display position adjustment process described above is executed when the control unit 4B adjusts the positions of the liquid crystal panels 212 opposing each other in a relative manner, and when the control unit 4B adjusts, with respect to an optical image formed by the liquid crystal panel 212 modulating a predetermined color of lights, the positions of the remaining liquid crystal panels 212.

To be specific, first of all, the control unit 4B executes the above-described display position adjustment process respectively to the liquid crystal panels for lights of red, i.e., 212R1 and 212R2, the liquid crystal panels for lights of green, i.e., 212G1 and 212G2, and the liquid crystal panels for lights of blue, i.e., 212B1 and 212B2. This accordingly adjusts the positions of the liquid crystal panels 212 that are opposing each other and provided to each color of lights, i.e., the relative position between the liquid crystal panel 212 on the forward side of the optical path and the liquid crystal panel 212 on the rearward side thereof.

Thereafter, for the liquid crystal panels 212R, 212G, and 212B provided to each color of lights, the above-described display position adjustment process is executed. At this time, the liquid crystal panels 212R, 212G, and 212B are adjusted in position in such a manner as to derive alignment of pixels on the projection surface for the optical images of red, green, and blue formed by the liquid crystal panels 212R, 212G, and 212B.

As such, the optical images to be formed by the liquid crystal panels 212R, 212G, and 212B are aligned, on a pixel basis, on the projection surface. Note that the process order for such position adjustment of the liquid crystal panels 212 may be changed as appropriate.

With the image display device 1B in the third embodiment as such, the effects similar to those by the image display device 1 of the first embodiment can be achieved.

Modification of Embodiments

Embodiments are not restrictive to the first through third embodiments described above, and it should be understood that numerous other modifications and variations may be devised.

In the first and second embodiments, the image display devices 1 and 1A are each configured to include the two image display sections 2A and 2B each including the optical engine 21. Alternatively, the image display sections 2A and 2B may be each configured as a projector, and the image display device may be configured as a multi-projection system. That is, the optical engine forming, through projection, an optical image in accordance with image information is not restrictive in form and style.

If this is the case, the control unit may be configured as a control device that controls over the operation of each of the projectors.

In the first and second embodiments, the image display devices 1 and 1A are each configured to include the two image display sections 2A and 2B each including the optical engine 21. The embodiments are not restrictive thereto, i.e., the number of the optical engines 21 forming, through projection, optical images may be at least two or more, and the number of the optical engines may be changed as appropriate. Moreover, in the third embodiment, two of the liquid crystal panels 212 are provided to each color of lights being the separation results by the color separation optical device 214. This is not restrictive, and the number of the liquid crystal panels is not restrictive as long as at least a pair of liquid crystal panels are provided, and as long as an optical image formed by one of the liquid crystal panels is adjusted in position in accordance with another optical image formed by the other liquid crystal panel.

The optical engine may not necessarily include a light source device and a projection lens. As an alternative configuration, as described in the third embodiment, luminous fluxes passing through a plurality of liquid crystal panels each being a light modulation device may be emitted from a single light source device, or luminous fluxes of an optical image formed by each of the liquid crystal panels may be projected by a single projection lens. That is, a plurality of optical engines may share the same light source device and projection lens.

In the above embodiments, the characteristics of an optical image are exemplified by the image characteristics of any captured image acquired by the characteristics acquisition section 44 of the control units 4 and 4A, and the image forming characteristics of the optical engines 21 stored in the storage section 43. This is surely not restrictive, and the reference image setting section may determine any other characteristics of an optical image to be formed by the optical engines 21, and based on the determination result, the setting of a reference image may be performed.

In the above embodiments, optical images formed by the image display sections 2, i.e., 2A, 2B, and 2C, are projected onto the projection surface of a screen or others by the projection lens 213 equipped to each of the image display sections 2. This is surely not restrictive, and the embodiments are applicable to an image display device of a type directly viewing any formed optical images.

The preceding is merely a description of several embodiments. While specific embodiments and applications have been illustrated and described, it is to be understood that the precise configuration and components disclosed herein is illustrative only and not limiting in any sense. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents, and shall not be restricted or limited by the foregoing description.

What is claimed is:

1. An image display device, comprising:
    a light source configured to provide a luminous flux;
    a plurality of light modulation devices configured to form a plurality of optical images through modulation of the luminous flux provided by the light source in accordance with image information, the light modulation devices being further configured to display an image by combining at least a portion of the optical images;
    a position change unit configured to move the optical images for position change; and
    a control unit configured to control the image display device, the control unit comprising:
        a characteristics acquisition section configured to acquire one or more characteristics of one or more of the optical images, the characteristics of the optical images including at least either an intensity of the optical images or a chromaticity of the optical images;
        a reference image setting section configured to designate one of the optical images as a reference image based on the acquired characteristics of the optical images and a remaining number of the optical images as non-reference images, the reference image setting section being configured to select, as the reference image, an optical image from within the optical images showing a largest value for the intensity or the chromaticity; and
        a position change unit control section configured to cause the position change unit to move the non-reference images in accordance with a pixel position of the reference image.

2. The image display device according to claim 1, further comprising a plurality of light sources and a plurality of image display sections, and wherein each of the image display sections comprises:
    a light source from within plurality of light sources;
    a light modulation device from within the plurality of light modulated devices configured to form an optical image from within the plurality of optical images; and
    a projection optical device configured to project the optical image onto a projection surface.

3. The image display device according to claim 1, wherein the position change unit control section is configured to cause pixels of the non-reference images to overlay pixels of the reference image.

4. The image display device according to claim 1, wherein the position change unit control section is configured to cause the pixels of the non-reference images to be located in between the pixels of the reference image.

5. The image display device according to claim 1, further comprising
    an image capturing unit configured to capture the displayed optical images, and further wherein
    the control unit includes a captured image acquisition section configured to acquire the optical images from the image capturing unit, and
    the characteristics acquisition section is configured to acquire the characteristics of the optical images from the images acquired by the captured image acquisition section.

6. The image display device according to claim 1, further comprising a storage section configured to store resolution information including a resolution for each of the light modulation devices, and wherein
    the reference image setting section is configured to select, as the reference image, an optical image from within the optical images corresponding to the light modulation device showing a largest value for the resolution.

7. The image display device according to claim 1, wherein the characteristics of the optical images include a cumulative drive time of the light modulation devices, and
    wherein the reference image setting section is configured to select, as the reference image, an optical image from within the optical images corresponding to the light modulation device showing a smallest value for the cumulative drive time.

8. The image display device according to claim 5, wherein the characteristics of the optical images include at least either an occurrence frequency of an intensity variation in the optical images or an occurrence frequency of a color variation in the optical images, and
    the reference image setting section is configured to select, as the reference image, an optical image from within the optical images showing a smallest value for the occurrence frequency of the intensity variation or the occurrence frequency of the color variation.

9. The image display device according to claim 5, wherein the image capturing unit further comprises a plurality of image-capturing pixels aligned in a predetermined direction,
    the characteristics of the optical images include a tilt of the optical images, and
    the reference image setting section is configured to select, as the reference image, an optical image from within the optical images showing a smallest value for the tilt in the predetermined direction.

10. A display position adjustment method for an image display device including a light source configured to provide a luminous flux and a plurality of light modulation devices configured to form optical images through modulation of the luminous flux provided by the light source in accordance with image information, the light modulation devices being further configured to display an image by combining at least a portion of the optical images, the image display device including a position change unit configured to move the optical images, the display position adjustment method comprising:
- acquiring one or more characteristics of the optical images, the characteristics of the optical images including at least either an intensity of the optical images or a chromaticity of the optical images;
- designating one of the optical images for use as a reference image based on the acquired characteristics of the optical images, the reference image being a selected optical image from within the optical images showing a largest value for the intensity or the chromaticity;
- designating a remaining number of the optical images as non-reference images; and
- moving the non-reference images in response to the position change unit and in accordance with a pixel position of the reference image.

11. The display position adjustment method according to claim 10, wherein
the image display device further comprises
a storage section configured to store image forming characteristics for each of the light modulation devices, and
an image capturing unit configured to capture the optical images,
and wherein the act of selecting further comprises:
- performing a first reference image setting process for setting the reference image based on the image forming characteristics stored in the storage section; and
- if the reference image is not set by the first reference image setting process, performing a second reference image setting process of setting the reference image based on the characteristics of the optical images captured by the image capturing unit.

12. A display position adjustment program product for an image display device including a light source configured to provide a luminous flux and a plurality of light modulation devices configured to form optical images through modulation of the luminous flux, the light modulation devices being further configured to display an image by combining at least a portion of the optical images, the image display device including a control unit configured to control the image display device, and a position change unit configured to move the optical images, the program product comprising instructions executable by the control unit to perform functions of:
- acquiring characteristics of the optical images, the characteristics of the optical images including at least either an intensity of the optical images or a chromaticity of the optical images;
- selecting one of the optical images as a reference image based on the characteristics of the optical images and a remaining number of the optical images as non-reference images, the reference image being a selected optical image from within the optical images showing a largest value for the intensity or the chromaticity; and
- moving the non-reference images in accordance with a pixel position of the reference image.

13. A method comprising:
- modulating a light to form a plurality of optical images;
- acquiring characteristics of the optical images, the characteristics of the optical images including at least either an intensity of the optical images or a chromaticity of the optical images;
- selecting at least one of the optical images for use as a reference image based on the acquired characteristics of the optical images, the reference image being a selected optical image from within the optical images showing a largest value for the intensity or the chromaticity; and
- moving a pixel position of the optical images not selected as the reference image in accordance with a pixel position of the reference image.

14. An image display device, comprising:
a light source configured to provide a luminous flux;
a plurality of light modulation devices configured to form a plurality of optical images through modulation of the luminous flux provided by the light source in accordance with image information, the light modulation devices being further configured to display an image by combining at least a portion of the optical images;
a position change unit configured to move the optical images for position change; and
a control unit configured to control the image display device, the control unit comprising:
- a characteristics acquisition section configured to acquire one or more characteristics of one or more of the optical images, the characteristics of the optical images including at least either an occurrence frequency of an intensity variation in the optical images or an occurrence frequency of a color variation in the optical images;
- a reference image setting section configured to designate one of the optical images as a reference image based on the acquired characteristics of the optical images and a remaining number of the optical images as non-reference images, the reference image setting section being configured to select, as the reference image, an optical image from within the optical images showing a smallest value for the occurrence frequency of the intensity variation or the occurrence frequency of the color variation; and
- a position change unit control section configured to cause the position change unit to move the non-reference images in accordance with a pixel position of the reference image.

15. An image display device, comprising:
a light source configured to provide a luminous flux;
a plurality of light modulation devices configured to form a plurality of optical images through modulation of the luminous flux provided by the light source in accordance with image information, the light modulation devices being further configured to display an image by combining at least a portion of the optical images;
a position change unit configured to move the optical images for position change;
an image capturing unit configured to capture the displayed optical images, the image capturing unit comprising a plurality of image-capturing pixels aligned in a predetermined direction; and
a control unit configured to control the image display device, the control unit comprising:
- a captured image acquisition section configured to acquire the optical images from the image capturing unit;
- a characteristics acquisition section configured to acquire one or more characteristics of one or more of the optical images, the characteristics acquisition section being configured to acquire the characteristics of the optical images from the images acquired by the captured image acquisition section, the characteristics of the optical images including a tilt of the optical images;

a reference image setting section configured to designate one of the optical images as a reference image based on the acquired characteristics of the optical images and a remaining number of the optical images as non-reference images, the reference image setting section being configured to select, as the reference image, an optical image from within the optical images showing a smallest value for the tilt in the predetermined direction; and a position change unit control section configured to cause the position change unit to move the non-reference images in accordance with a pixel position of the reference image.

16. An image display device, comprising:

a light source configured to provide a luminous flux;

a plurality of light modulation devices configured to form a plurality of optical images through modulation of the luminous flux provided by the light source in accordance with image information, the light modulation devices being further configured to display an image by combining at least a portion of the optical images;

a position change unit configured to move the optical images for position change;

a storage section configured to store resolution information including a resolution for each of the light modulation devices; and a control unit configured to control the image display device, the control unit comprising:

a characteristics acquisition section configured to acquire one or more characteristics of one or more of the optical images;

a reference image setting section configured to designate one of the optical images as a reference image based on the acquired characteristics of the optical images and a remaining number of the optical images as non-reference images, the reference image setting section being configured to select, as the reference image, an optical image from within the optical images corresponding to the light modulation device showing a largest value for the resolution; and a position change unit control section configured to cause the position change unit to move the non-reference images in accordance with a pixel position of the reference image.

17. An image display device, comprising:

a light source configured to provide a luminous flux;

a plurality of light modulation devices configured to form a plurality of optical images through modulation of the luminous flux provided by the light source in accordance with image information, the light modulation devices being further configured to display an image by combining at least a portion of the optical images;

a position change unit configured to move the optical images for position change; and a control unit configured to control the image display device, the control unit comprising:

a characteristics acquisition section configured to acquire one or more characteristics of one or more of the optical images, the characteristics of the optical images including a cumulative drive time of the light modulation devices;

a reference image setting section configured to designate one of the optical images as a reference image based on the acquired characteristics of the optical images and a remaining number of the optical images as non-reference images, the reference image setting section being configured to select, as the reference image, an optical image from within the optical images corresponding to the light modulation device showing a smallest value for the cumulative drive time; and a position change unit control section configured to cause the position change unit to move the non-reference images in accordance with a pixel position of the reference image.

* * * * *